United States Patent
Samanta Singhar

(10) Patent No.: US 9,619,017 B2
(45) Date of Patent: Apr. 11, 2017

(54) TECHNIQUES FOR UTILIZING A COMPUTER INPUT DEVICE WITH MULTIPLE COMPUTERS

(71) Applicant: QUALCOMM Incorporated, San Diego, CA (US)

(72) Inventor: Anil Ranjan Roy Samanta Singhar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 723 days.

(21) Appl. No.: 13/671,353

(22) Filed: Nov. 7, 2012

(65) Prior Publication Data

US 2014/0125575 A1 May 8, 2014

(51) Int. Cl.
*G06F 3/01* (2006.01)
*G06F 3/00* (2006.01)
(Continued)

(52) U.S. Cl.
CPC .............. *G06F 3/011* (2013.01); *G06F 3/005* (2013.01); *G06F 3/013* (2013.01); *G06F 3/038* (2013.01);
(Continued)

(58) Field of Classification Search
CPC .......... G06F 3/005; G06F 3/011; G06F 3/013; G06F 3/038; G06F 3/1423; G06F 3/1446;
(Continued)

(56) References Cited

U.S. PATENT DOCUMENTS 5,990,868 A  11/1999  Frederick
6,734,845 B1 * 5/2004 Nielsen ................. G06F 1/3209
                                                          345/211
(Continued)

FOREIGN PATENT DOCUMENTS

DE     102007061537 A1   7/2009
EP          0794482 A1   9/1997
(Continued)

OTHER PUBLICATIONS

Gil L., "Logitech's newest bluetooth keyboard makes typing on multiple devices easy: Hands-on accessory review", PadGadget, Nov. 7, 2012, p. 1-10, <URL:http://www.padgadget.com/2012/11/07/logitechs-newest-bluetooth-keyb . . . ultiple-devices-easy-hands-on-accessory-review/#.UPR_ce6resl.email>.
(Continued)

*Primary Examiner* — Tony Davis
(74) *Attorney, Agent, or Firm* — Kevin T. Cheatham; Charles E. Eggers

(57) ABSTRACT

A method includes analyzing data associated with an image captured by a camera to determine a visual orientation and/or eye gaze movement of a user of a computer. Upon detecting that the visual orientation indicates that the user is visually oriented toward a display device associated with the computer, a wireless connection from the computer to a computer input device and from the computer input device to the computer is established or maintained. Upon detecting that the visual orientation indicates that the user is not visually oriented toward the display device associated with the computer, the wireless connection is terminated. Another method accomplishes similar objectives using proximity sensors.

37 Claims, 10 Drawing Sheets

(51) Int. Cl.
*G06F 3/038* (2013.01)
*G06F 3/14* (2006.01)

(52) U.S. Cl.
CPC .......... *G06F 3/1423* (2013.01); *G06F 3/1446* (2013.01); *G09G 2330/022* (2013.01); *G09G 2354/00* (2013.01); *G09G 2356/00* (2013.01)

(58) Field of Classification Search
CPC ......... G09G 2330/022; G09G 2354/00; G09G 2356/00
USPC .................................. 345/619, 156; 348/77
See application file for complete search history.

(56) References Cited

U.S. PATENT DOCUMENTS

| | | | |
|---|---|---|---|
| 6,912,605 B1* | 6/2005 | Wright | 710/60 |
| 7,162,232 B2 | 1/2007 | Ramakesavan et al. | |
| 7,346,192 B2 | 3/2008 | Yuasa et al. | |
| 7,379,560 B2* | 5/2008 | Bradski | G06F 1/3203 345/156 |
| 7,380,142 B2* | 5/2008 | Lee | G06F 1/266 713/300 |
| 7,768,389 B2 | 8/2010 | Frank | |
| 7,893,923 B2 | 2/2011 | Robideaux et al. | |
| 7,949,805 B2 | 5/2011 | Grushkevich | |
| 8,006,002 B2 | 8/2011 | Kalayjian et al. | |
| 8,015,010 B2 | 9/2011 | Basir | |
| 8,346,985 B2 | 1/2013 | Chassot et al. | |
| 9,264,608 B2* | 2/2016 | Lee | H04N 5/23241 |
| 9,436,643 B2* | 9/2016 | Dees | H04M 1/7253 |
| 2001/0045985 A1 | 11/2001 | Edwards et al. | |
| 2004/0113890 A1 | 6/2004 | Ranta | |
| 2004/0198306 A1* | 10/2004 | Singh | H04M 1/66 455/345 |
| 2004/0240708 A1* | 12/2004 | Hu | G06F 3/012 382/103 |
| 2004/0267983 A1* | 12/2004 | Oda | H04L 47/11 710/56 |
| 2006/0052109 A1* | 3/2006 | Ashman | G06F 1/1626 455/440 |
| 2006/0192775 A1 | 8/2006 | Nicholson et al. | |
| 2006/0250360 A1 | 11/2006 | Goodwin et al. | |
| 2007/0024579 A1* | 2/2007 | Rosenberg | G06F 3/013 345/156 |
| 2007/0042807 A1 | 2/2007 | Khoo et al. | |
| 2007/0130371 A1 | 6/2007 | Chung et al. | |
| 2007/0132733 A1 | 6/2007 | Ram | |
| 2007/0143535 A1 | 6/2007 | Kitamura et al. | |
| 2007/0249324 A1* | 10/2007 | Jou | H04L 63/06 455/411 |
| 2007/0260905 A1* | 11/2007 | Marsden et al. | 713/323 |
| 2008/0024433 A1* | 1/2008 | Gunther et al. | 345/156 |
| 2009/0077283 A1* | 3/2009 | Grushkevich | 710/72 |
| 2009/0156131 A1* | 6/2009 | Takasu | H04W 72/02 455/68 |
| 2009/0292788 A1* | 11/2009 | Miyamae | 709/211 |
| 2010/0054519 A1 | 3/2010 | Mulvey et al. | |
| 2010/0066821 A1* | 3/2010 | Rosener | G06F 3/011 348/77 |
| 2010/0205667 A1 | 8/2010 | Anderson et al. | |
| 2010/0220975 A1 | 9/2010 | Kondo et al. | |
| 2010/0235667 A1* | 9/2010 | Mucignat | G06F 1/3203 713/323 |
| 2010/0238041 A1 | 9/2010 | Acedo et al. | |
| 2010/0332702 A1 | 12/2010 | Wu et al. | |
| 2010/0333170 A1* | 12/2010 | Cox et al. | 726/1 |
| 2011/0109715 A1* | 5/2011 | Jing | H04N 7/147 348/14.08 |
| 2011/0256831 A1 | 10/2011 | Hsieh | |
| 2011/0304543 A1 | 12/2011 | Chen | |
| 2011/0317872 A1* | 12/2011 | Free | G06K 9/00228 382/103 |
| 2012/0007820 A1* | 1/2012 | Lee | G06F 1/1626 345/173 |
| 2012/0062442 A1 | 3/2012 | Locker et al. | |
| 2012/0194435 A1 | 8/2012 | Tsai et al. | |
| 2012/0260307 A1 | 10/2012 | Sambamurthy et al. | |
| 2012/0265913 A1* | 10/2012 | Suumaki | H04W 4/008 710/303 |
| 2013/0042010 A1 | 2/2013 | Reunamaki et al. | |
| 2013/0139044 A1* | 5/2013 | Iversen | G06F 17/243 715/224 |
| 2013/0159563 A1* | 6/2013 | Diard | G06F 13/28 710/24 |
| 2013/0167196 A1* | 6/2013 | Spencer | H04W 8/22 726/3 |
| 2013/0222270 A1 | 8/2013 | Winkler et al. | |
| 2013/0285911 A1 | 10/2013 | Nissen et al. | |
| 2014/0247208 A1 | 9/2014 | Henderek et al. | |
| 2014/0256257 A1 | 9/2014 | Thangella | |
| 2014/0375586 A1 | 12/2014 | de Léon et al. | |
| 2015/0056920 A1* | 2/2015 | Huttunen | H04B 7/26 455/41.2 |
| 2015/0153827 A1 | 6/2015 | Yun et al. | |

FOREIGN PATENT DOCUMENTS

| | | |
|---|---|---|
| EP | 1388779 A1 | 2/2004 |
| EP | 2261772 A1 | 12/2010 |
| EP | 2613226 A1 | 7/2013 |
| JP | 2000089905 A | 3/2000 |
| WO | WO-2010142455 A2 | 12/2010 |
| WO | WO-2011022014 A1 | 2/2011 |
| WO | WO-2013089693 A1 | 6/2013 |

OTHER PUBLICATIONS

Partial International Search Report—PCT/US2013/068873—ISA/EPO—Jan. 8, 2014.
International Search Report and Written Opinion—PCT/US2013/068873—ISA/EPO—Mar. 19, 2014.

* cited by examiner

TECHNIQUES FOR UTILIZING A COMPUTER INPUT DEVICE WITH MULTIPLE COMPUTERS

I. FIELD

The present disclosure is generally related to workstations that include multiple computers and one or more computer input devices shared between the multiple computers.

II. DESCRIPTION OF RELATED ART

Advances in technology have resulted in smaller and more powerful computing devices. For example, a workspace may include multiple computers on which users perform different tasks or use different operating systems. The users may control the computers using computer input devices, such as a mouse and a keyboard. Because it may be inconvenient for a user to switch back and forth between multiple computer input devices, the user may utilize a single mouse and a single keyboard to control the multiple computers. For example, the user may install software that enables switching of control from one computer to another in response to reconfigure the software each time the physical configuration is changed or when the user relocates to a new workspace, which may be inconvenient and may reduce work efficiency. In another example, control may be manually activated, such as via a user-controlled switch.

III. SUMMARY

An example workspace in accordance with the present disclosure includes computers having cameras to detect presence or absence of a user. For example, the workspace may include multiple computers that each include a "webcam" camera. A profile may be created on each of the computers such that each computer is able to detect presence/absence of the user using a corresponding camera. In at least one embodiment, the computer determines a visual orientation of the user (e.g., whether the user is looking at the corresponding computer or at a display of the corresponding computer) based on whether the user's line of sight is directed at the computer. Upon the user transitioning from present to absent at a particular computer, the computer may detect (e.g., using the camera) the transition and disconnect the computer input device(s), at which time the computer input device(s) may go to sleep or prepare to connect to another computer. Such selective creation and termination of wireless connections may simplify switching between the computers by the user and may further save battery power of workspace computer input devices. According to further embodiments, proximity data associated with a computer input device may be used to determine whether to establish, maintain, or terminate a wireless connection between a computer and the computer input device. In addition, the profile may indicate conditions in response to which connections are to be established and terminated.

According to further embodiments, computers (e.g., a desktop computer including a display) and a computer input device may be equipped with proximity detectors (e.g., near field communication (NFC) radios) to provide proximity data between the computers and the computer input device, as described further below at least with reference to FIGS. 3 and 4. The proximity data can be in different forms, such as a received signal strength indicator (RSSI), RSSI based distance estimates, a signal indicating that the computer input device is within a predetermined range of one of the computers, or a combination thereof. In at least some applications, because a small computer input device (e.g., a small mouse device) is not typically within NFC range of both the computers simultaneously, the proximity data can be used to determine which of the two computers the user intends to control using the computer input device. After determining the intention of the user, a new wireless connection between one of the computers and the computer input device may be established, an existing connection between one of the computers and the computer input device may be terminated or maintained, or a combination thereof. Alternatively or in addition, a user profile may indicate conditions in response to which such connections are to be established and/or terminated.

In a particular embodiment, a method includes analyzing data associated with an image captured by a camera to determine a visual orientation of a user of a computer. Upon detecting that the visual orientation indicates that the user is visually oriented toward a display device associated with the computer, a wireless connection from the computer to a computer input device and from the computer input device to the computer is established or maintained. Upon detecting that the visual orientation indicates that the user is not visually oriented toward the display device associated with the computer, the wireless connection is terminated.

In another embodiment, to enable "seamless" transitions of a computer input device (e.g., a mouse) between computers associated with respective displays, a relative physical position of a first display with respect to a second display (e.g., a left-hand-side display and a right-hand-side display) may be determined. For example, gaze of a user may be monitored (e.g., from left to right or from right to left) and movement of a mouse pointer (e.g., a mouse cursor) may be monitored (e.g., from left to right or from right to left), for example using a camera and desktop manager, respectively. Because the directions of movement of the gaze of the user and the mouse pointer may follow a similar pattern (e.g., the movement of the mouse pointer may follow the movement of the gaze of the user), connections between the mouse and the displays may be selectively established and/or terminated. As an example, if a first desktop manager of a first computer associated with the first display determines that the mouse pointer has reached either the left-hand or right-hand boundary associated with the first display, the first computer may send a corresponding indication to the mouse. In response to receiving the indication, the mouse may determine if another computer, such as a second computer corresponding to the second display, has attempted to connect to the mouse (e.g., if the mouse has received a connection request from the second computer within a prior predetermined time interval). If the mouse determines that the second computer has attempted to connect to the mouse, the mouse may inform the first computer that the mouse is to disconnect a wireless connection with the first computer (e.g., because the gaze of the user has moved away from the display of the first computer).

In a particular embodiment, upon receiving the information from the mouse, the first computer can determine whether the first computer is positioned to the left-hand-side or to the right-hand-side of the user. For example, if a determination is made by the first computer that the user initially began using the mouse to control the first computer, the determination may be utilized to determine left/right orientation (e.g., relative arrangement) of the first computer and the second computer. Such a determination may avoid requiring a user to "designate" which computer is "left" and which computer is "right."

To illustrate, if the gaze of the user moves from left to right and the mouse pointer moves from left to right and reaches the right-hand boundary of the first display, the first desktop manager of the first computer may determine that both the gaze of the user and the mouse pointer moved in a similar direction. The first desktop manager of the first computer may send to the mouse (or other computer input device) a corresponding indication that the gaze of the user and the mouse pointer moved in a similar direction. In response to receiving the indication from the first computer, the mouse may determine whether it received a new connection request from another computer (e.g., the second computer) and may respond to the first computer accordingly. The first computer may determine that the new connection request to the mouse was initiated by another computer to which the gaze of the user has transitioned. Because the direction of the movement of the gaze was from left to right, the first computer may determine that the first computer corresponds to the left-hand-side display. The first computer may accordingly initiate disconnection of a wireless connection with the mouse.

Continuing with the foregoing example, if the mouse did not receive a new connection request from another computer, the mouse may respond to the first computer, and no disconnection will be initiated by the first computer. As will be appreciated, at this point it is possible that the first computer is the right-hand-side computer. Thus, the first desktop manager of the first computer may wait until another transition has occurred (e.g., until determining that a new connection request has been made and that the user intends to transition control of the mouse to another computer) before determining relative position of the first computer.

Once determined, the relative position can be utilized to enable "seamless" transition of the mouse from the first computer to the second computer by initiating a direct connection between the first computer and the second computer mediated by the mouse or other computer input device. After the direct connection is established, the mouse or other computer input device may stay connected to the first computer, which may forward mouse pointer information (e.g., information indicating where the mouse pointer is to appear on the second display) to the second computer (e.g., in response to coordinates associated with the mouse pointer falling in a range associated with the second display). Thus, in at least one embodiment, position configuration may be created dynamically and may be deleted automatically without explicit user designation.

In another particular embodiment, an apparatus includes a proximity detector configured to detect a computer input device and to generate proximity data in response to detecting the computer input device. The proximity detector is further configured to communicate wirelessly with the computer input device via a near field communication (NFC) protocol. The apparatus further includes a proximity analyzer configured to analyze the proximity data to determine whether the computer input device is within a predetermined range of the proximity detector. The apparatus further includes a wireless transceiver coupled to the proximity analyzer. The wireless transceiver is configured to establish or maintain a wireless connection with the computer input device upon the proximity analyzer determining that the computer input device is within the predetermined range. The wireless transceiver is further configured to terminate the wireless connection upon the proximity analyzer determining that the computer input device is not within the predetermined range.

Determining proximity (e.g., between devices within a range of a few centimeters) may accommodate small computer input devices, such as mouse or a stylus. However, in some applications, such a proximity-based technique may not be suitable for relatively larger computer input devices (e.g., devices of a larger "form factor"), such as a full-size keyboard. In such cases, a larger computer device may be "bound" to a smaller computer input device, such as a mouse, to determine a user's intent to control a particular display. That is, when proximity sensors may be inefficient or ineffective to determine the user's intention, the larger computer input device may be associated with the smaller computer input device (since, for example, a user may intend to use either all of a set of computer input devices or none of the set of computer input devices to control the particular display). In such cases, once a user's intention is determined by a particular computer based on proximity data associated with the smaller computer input device (e.g., a mouse), the particular computer may establish a respective wireless connection to other available computer input devices (e.g., a full-size keyboard) based on the proximity data associated with the smaller computer input device.

Further, the above technique can be adapted to enable transitioning of control by a computer input device by utilizing proximity detectors (e.g., sensors). For example, a proximity detector may determine user actions such as "moving away" and "moving closer" of the computer input device relative to a first computer (or display) based on variations in received radio signal strength (RSSI) or other applicable parameters, such as magnetic flux, etc. If the computer input device is a mouse, such "moving away" or "moving closer" information may be analyzed in addition to movements of a mouse pointer to determine user intention to transition to a different computer, which may enable determination of a relative position of the first computer. For example, according to a particular example, if a user "powers on" (e.g., logs onto) the first computer and uses the mouse to control the first computer, the first computer may not yet be able to determine its relative position (e.g., within a workstation and relative to another computer).

If the user moves the mouse (or other computer input device) away from the first computer and the mouse pointer moves from left to right and reaches the right-hand-side boundary associated with a first display of the first computer, a first desktop manager of the first computer may determine that the mouse has moved away from the first computer and that the mouse pointer has moved from left to right and has reached the right-hand-side boundary. The first desktop manager may cause the first computer to send to the mouse a message indicating the movement. In response to the message, the mouse may determine whether it has received a new connection request from another computer and may respond to the first computer based on the determination. If the mouse indicates that a new connection request was received, the first computer may determine that the new connection request to the mouse was initiated by a second computer which the user intends to control. Because the movement of the mouse was from left to right, the first computer may determine that it is the left-hand-side computer. Further, in response to determining that user intends to control the second computer, the first computer may initiate disconnection of a wireless connection with the mouse.

Continuing with the foregoing example, if the mouse did not receive a new connection request from another computer, the mouse may respond to the first computer and no disconnection will be initiated by the first computer. As will be appreciated, at this point it is possible that the first computer is the right-hand-side computer. Thus, the first desktop manager of the first computer may wait until another transition has occurred (e.g., until determining that a new connection request has been made and that the user intends to transition control of the mouse to another computer) before determining relative position of the first computer.

In another particular embodiment, an apparatus includes a user input portion configured to receive input from a user and a radio device coupled to the user input portion. The radio device is configured to communicate with a first computer via a first wireless connection and is further configured to communicate with a second computer via a second wireless connection. The apparatus further includes a buffer configured to buffer data received from the first computer and routing logic coupled to the radio device and to the buffer. The routing logic is configured to cause the data stored in the buffer to be transferred to the second computer.

In at least one embodiment, one or more upper layer applications, such as a desktop manager or another user mode program, are utilized to facilitate such operations as copying from one computer and pasting on another computer without a using pre-established connection between the computers. For example, using a mouse, a user may select (e.g., highlight) text (or other information) and copy it at a first computer. In this example, the text is copied to a clipboard buffer of the first computer. The user may then transfer control by the mouse to a second computer (e.g., based on one or more of the foregoing techniques, such as a visual orientation-based technique and/or a proximity-based technique) and attempt to perform a paste operation of the text at the second computer (e.g., at an editor running at the second computer).

Upon detecting the paste operation by the user, the mouse can facilitate transfer of the text from the first computer to the second computer according to any of multiple techniques. According to a first technique, the mouse re-establishes a connection with the first computer to copy the text from the first computer to a buffer of the mouse and transfers the text to the second computer. According to a second technique, the mouse may inform the second computer that the second computer is to request the text from the first computer. For example, the mouse may provide to the second computer a device address (e.g., Bluetooth address) of the first computer so that the second computer can establish a temporary connection with the first computer and receive the text (e.g., using an upper layer application) to complete the paste operation. These techniques may be implemented using upper layer protocols, such as via Bluetooth profiles.

In another particular embodiment, a method includes receiving a request at a first computer from a computer input device via a first wireless connection to send data stored at the first computer to a second computer. The request identifies whether the data has a data size that exceeds a threshold. When the data size exceeds the threshold, the data is sent to the second computer via a second wireless connection between the first computer and the second computer. When the data size does not exceed the threshold, the data is sent to the computer input device.

In another particular embodiment, a computer-readable non-transitory storage medium stores instructions executable by a processor to cause the processor to analyze data associated with an image captured by a camera to determine a visual orientation of a user of a computer. Upon detecting that the visual orientation indicates that the user is visually oriented toward a display device associated with the computer, a wireless connection from the computer to a computer input device and from the computer input device to the computer is established or maintained. Upon detecting that the visual orientation indicates that the user is not visually oriented toward the display device associated with the computer, the wireless connection is terminated.

According to a particular example, when not actively in use, a computer input device may remain in a low-power state (e.g., sleep or hibernate). To further save power, the computer input device may power down a radio device, terminating one or more wireless connections. When moved by a user, a sensor (e.g., a motion sensor) of the computer input device may power on the radio device and cause the computer input device to enter a page-scan mode in which the computer input device may receive wireless connection requests. While doing this, the user may be looking at a display of a computer (and hence also looking at a camera mounted on the display), thus enabling detection of presence of the user (e.g., by an image analyzer of the computer). Upon detecting presence of the user, the computer may page (e.g., send a wireless connection request to) the computer input device, thus initiating a wireless connection. The computer input device may initiate disconnection of the wireless connection based on not detecting user input for a threshold period of time, the computer may initiate disconnection of the wireless connection upon determining that the user is no longer focusing on (e.g., visually oriented toward) the display, or a combination thereof.

In another particular embodiment, an apparatus includes means for analyzing data associated with an image captured by a camera to determine a visual orientation of a user of a computer. The apparatus further includes means for establishing or maintaining, upon detecting that the visual orientation indicates that the user is visually oriented toward a display device associated with the computer, a wireless connection from the computer to a computer input device and from the computer input device to the computer and for terminating the wireless connection upon detecting that the visual orientation indicates that the user is not visually oriented toward the display device.

One particular advantage associated with at least one of the disclosed embodiments is improved transitioning of control by a computer input device from a first computer to a second computer. For example, upon detecting that a user is no longer focused on a display of the first computer, the first computer may disconnect the computer input device to enable the computer input device to save power. If a proximity sensor is utilized by the computer input device, the disconnection may be initiated by the computer input device rather than by the first computer. For example, the computer input device may terminate a wireless connection with the first computer and enter a page scan mode to enable the second computer to page (e.g., send a wireless connection request to) the computer input device to establish a wireless connection with the computer input device.

Alternatively or in addition to proximity-based workstations, for workstations that implement camera-based user detection, visual cues may be detected by a camera of a computer indicating that a user is looking at a display of the computer, thus indicating whether to establish, maintain, or terminate a wireless connection with a computer input device. That is, while the user intends to use the computer input device with the computer, the user is typically facing the display. Accordingly, the camera may detect presence of the user. For proximity-based workstations, the user may initiate the wireless connection by moving the computer input device within range of the computer, enabling a proximity detector (e.g., sensor) of the computer to detect the computer input device and to trigger establishing the wireless connection. In at least one embodiment, a "touch to pair" technique (e.g., an NFC signal triggering a Bluetooth pairing of devices) triggers the wireless connection.

After device connection, the user may move the computer input device away from within the range without disconnecting the computer input device. If, however, the user intends to transition control by the computer input device to a second computer, the user may move the computer input device close to the second computer (e.g., nearer to a second proximity detector of the second computer), enabling the second computer to detect computer input device. In response to detecting the computer input device, the second computer may initiate establishment of a wireless connection with the computer input device. In addition, the computer input device may initiate disconnection from the existing wireless connection.

As will be appreciated, for proximity-based workstations (e.g., workstations using NFC to connect/disconnect computer input devices), computers may be positioned well beyond NFC range (e.g., approximately three centimeters). Accordingly, a computer input device typically will not be within range of multiple computer proximity detectors at the same time, thus avoiding triggering undesired simultaneous connection of the computer input device with multiple computers. In a particular embodiment, for a workstation that includes laptop computers, proximity detector position may be standardized to a particular position of the laptop computers (e.g., at a right-front laptop corner, which may be an ergonomically convenient mouse position for right-handed users). Accordingly, when a user intends to transition computer input device control from a first computer to a second computer (e.g., another laptop), the user may move the computer input device sufficiently "out of range" of a proximity sensor of the first computer and into range of a proximity sensor of the second computer. As will be appreciated, proximity-based techniques may be associated with slight or subtle movements from the user such that the user may move within the range of the computer that the user intends to use. Accordingly, proximity-based techniques may be less applicable to large form factor devices, such as full-size keyboards (or other devices which users do not typically control via position change). In such cases, a visual cue-based technique may be used. Accordingly, wireless connections may be established and/or terminated "automatically," thus enabling a more efficient workstation and potentially saving power by enabling the devices to enter "low power" states after terminating wireless connections.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

Figure 8:
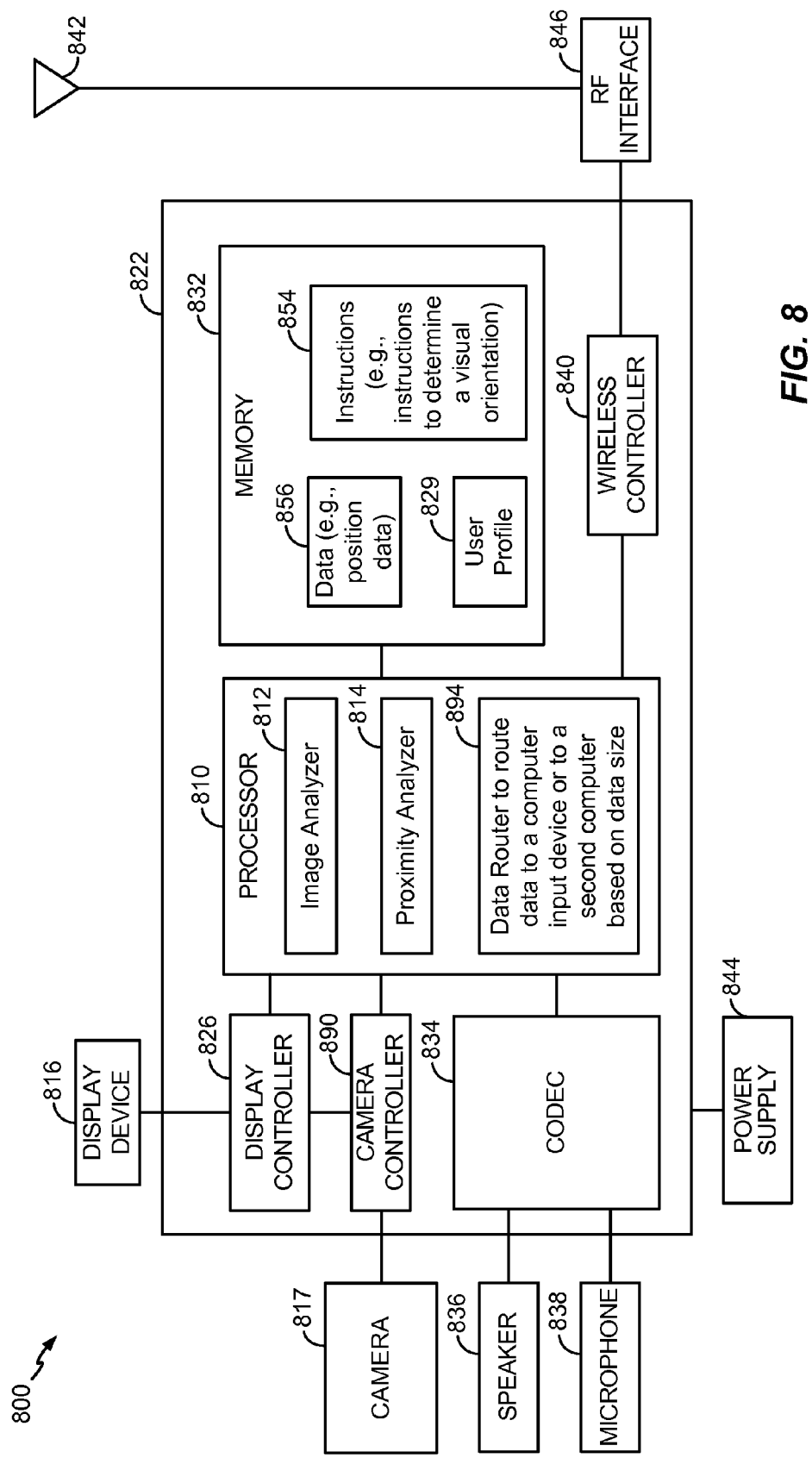
Figure 9:
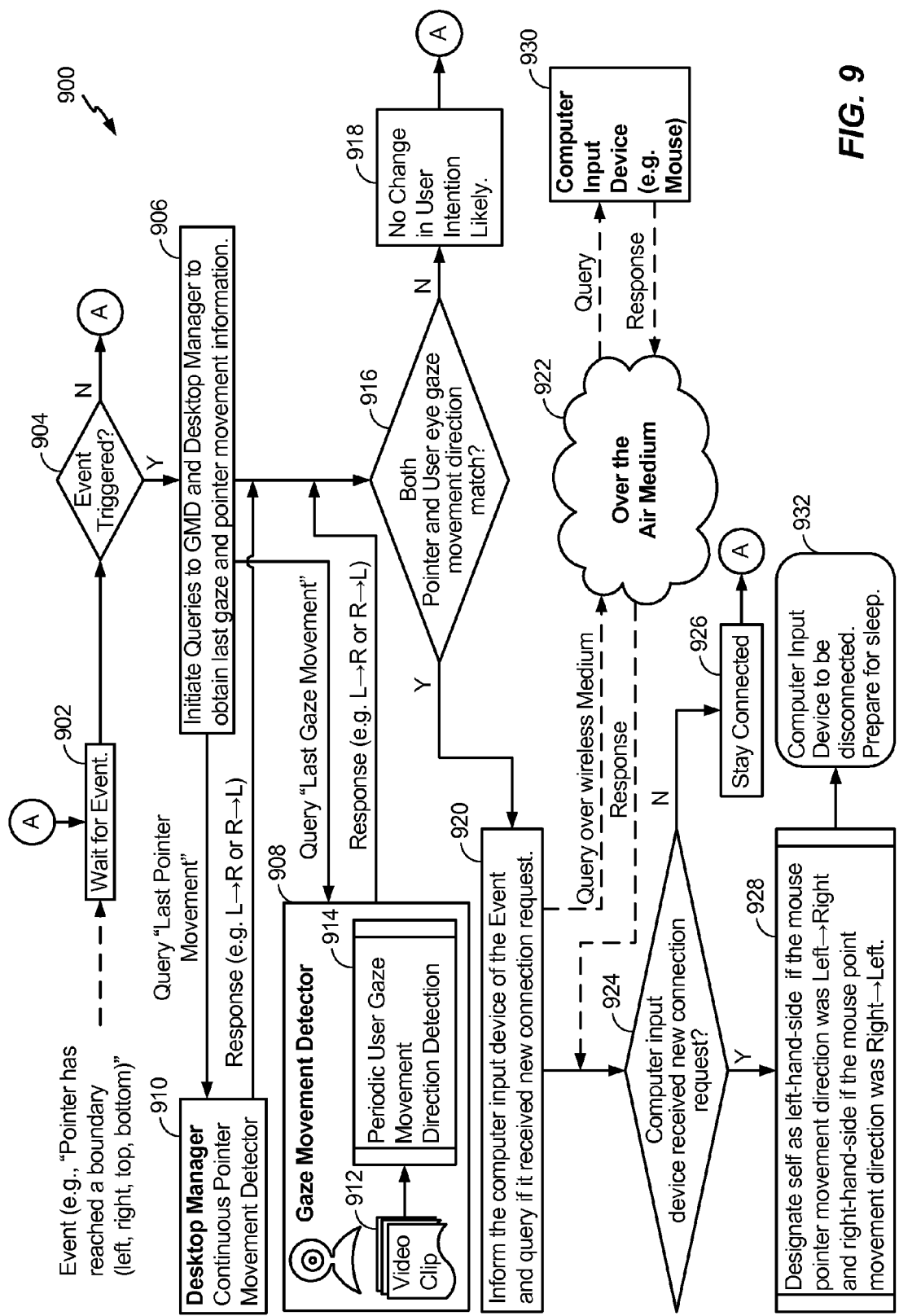
Figure 10:
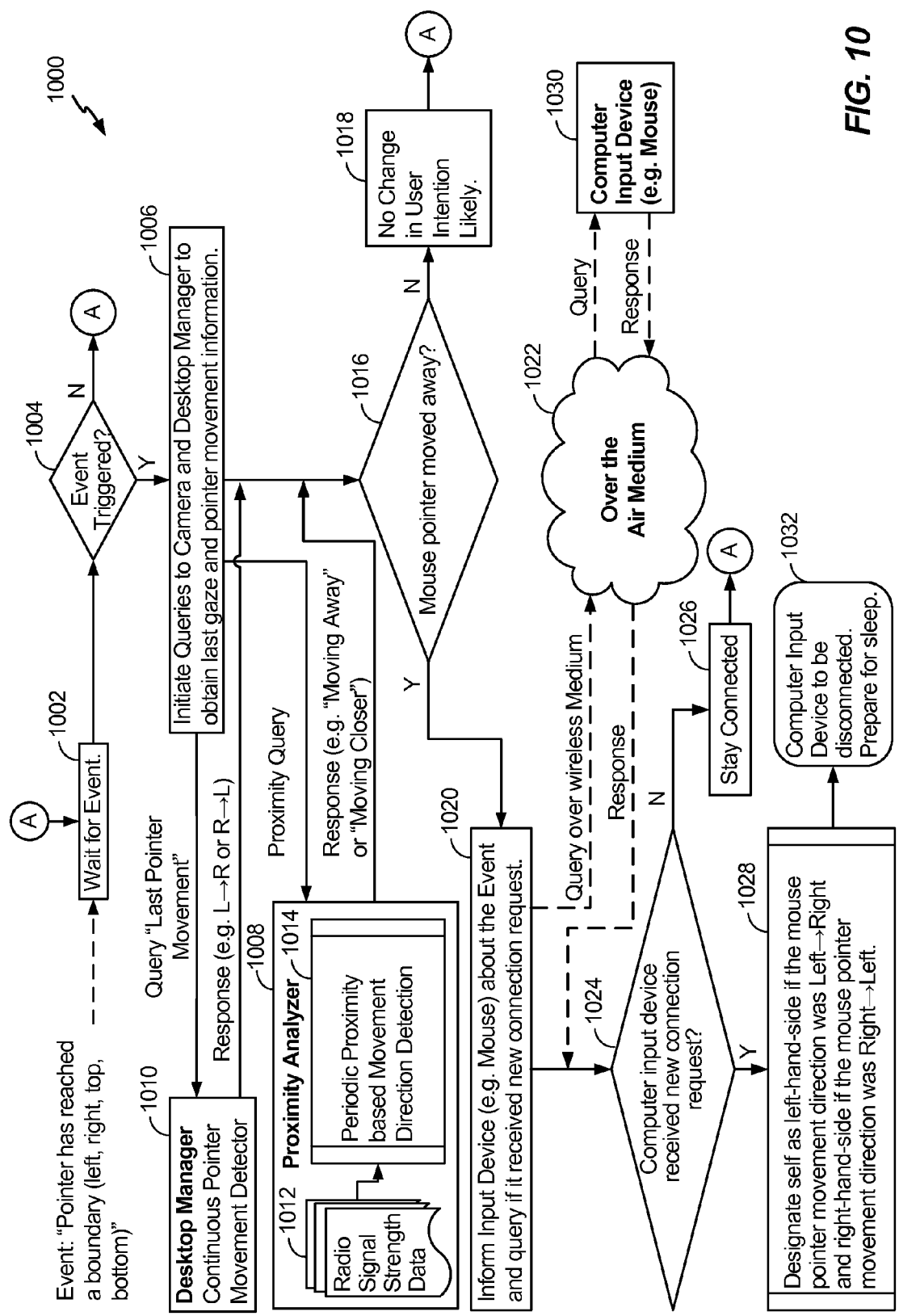

FIG. 8 is a diagram of a particular embodiment of a computer configured to establish, maintain, and/or terminate a wireless connection based on a visual orientation of a user, a proximity of a computer input device, or a combination thereof and/or to route data to a computer input device or to a second computer based on a data size FIG. 9 is a functional block diagram illustrating example operations of a workstation; and FIG. 10 is a functional block diagram illustrating example operations of a workstation.

V. DETAILED DESCRIPTION

Figure 1:
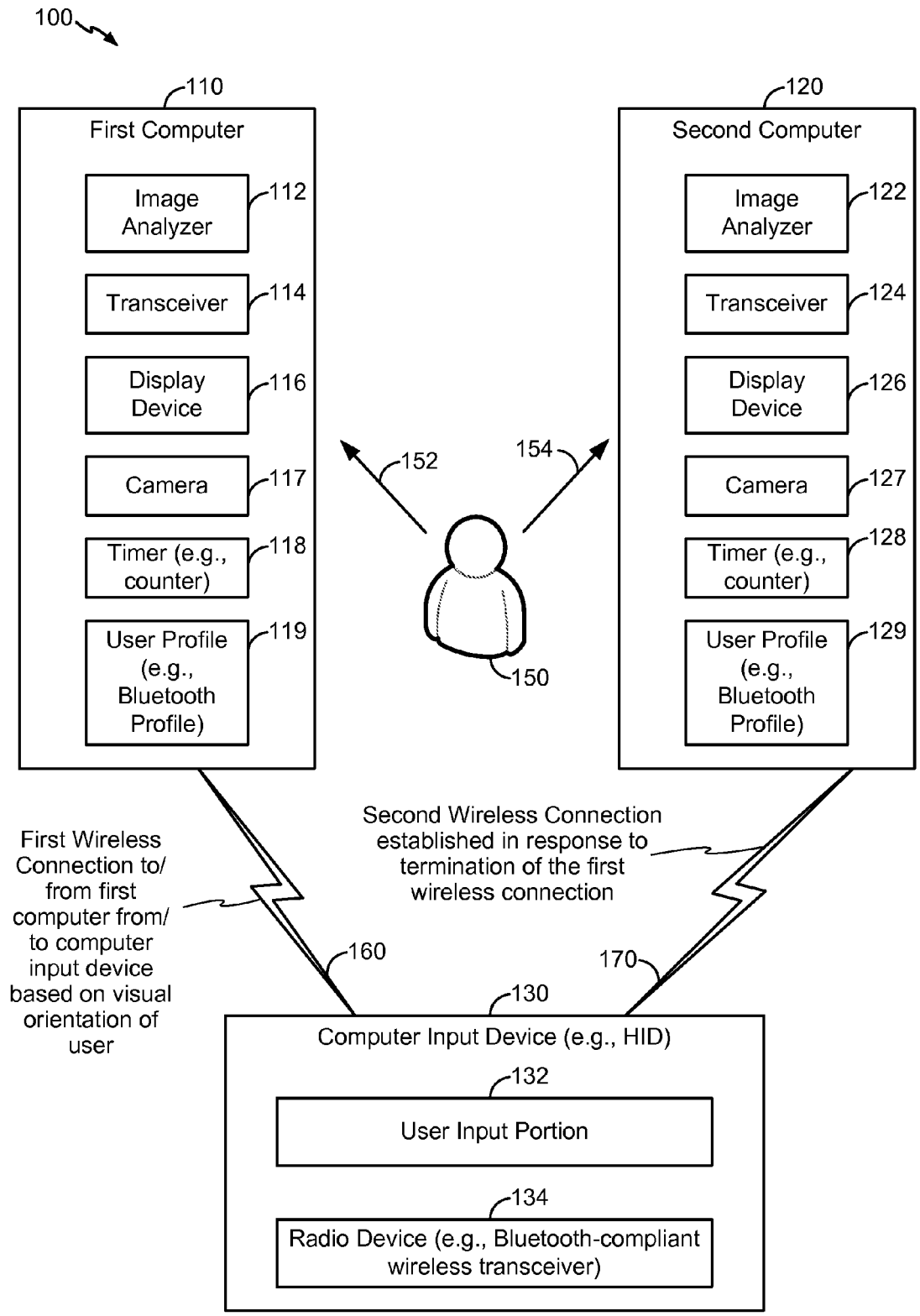
FIG. 1 is a diagram of a particular embodiment of a user and a workstation.

FIG. 1 depicts a particular illustrative embodiment of a user 150 and a workstation 100. The workstation 100 includes a first computer 110, a second computer 120, and a computer input device (e.g., a human interface device (HID)) 130. As used herein, "computer" may refer to a desktop computer, a laptop computer, a computer that includes a webcam, a computer monitor, or a combination thereof.

The first computer 110 may be a desktop computer, a laptop computer, another computing device, or a combination thereof. The first computer 110 and the computer input device 130 may be in communication via a first wireless connection 160. The first wireless connection 160 may be a direct wireless connection from the first computer 110 to the computer input device 130 and from the computer input device 130 to the first computer 110. In at least one embodiment, utilizing such a "direct" wireless connection avoids routing of communications between the first computer 110 and the computer input device 130 through a centralized device (e.g., a switch) or through computer-to-computer network connection, and thus may facilitate faster communications between the first computer 110 and the computer input device 130. The first wireless connection 160 may be associated with a short-range radio frequency band, such as a 2.4 gigahertz (GHz) radio frequency band. For example, the first wireless connection 160 may be a wireless connection that complies with an IEEE 802.15.1 wireless protocol, such as a "Bluetooth" wireless connection.

The second computer 120 may be a desktop computer, a laptop computer, another computing device, or a combination thereof. The second computer 120 and the computer input device 130 may be in communication via a second wireless connection 170. The second wireless connection 170 may be a "direct" wireless connection from the second computer 120 to the computer input device 130 and from the computer input device 130 to the second computer 120. In at least one embodiment, utilizing such a "direct" wireless connection avoids routing of communications between the second computer 120 and the computer input device 130 through a centralized device (e.g., a switch) or through a computer-to-computer network connection, which may facilitate faster communications between the second computer 120 and the computer input device 130. The second wireless connection 170 may be associated with a short-range radio frequency band, such as a 2.4 gigahertz (GHz) radio frequency band. For example, the second wireless connection 170 may be a wireless connection that complies with an IEEE 802.15.1 wireless protocol, such as a "Bluetooth" wireless connection.

In the particular example of FIG. 1, the first computer 110 includes a first image analyzer 112, a first transceiver 114, a first display device 116 (e.g., a monitor or other screen), a first camera 117 (e.g., a "webcam" of a laptop computer), a first timer 118 (e.g., a counter), and a first user profile 119. The first user profile 119 may store information specific to one or more users, such as the user 150, in connection with a wireless communication protocol, as explained further below.

The second computer 120 may include a second image analyzer 122, a second transceiver, 124, a second display device 126, a second camera 127 (e.g., a "webcam" of a laptop computer), a second timer 128 (e.g., a counter), and a second user profile 129. The second user profile 129 may store information specific to one or more users (e.g., specific to the user 150) in connection with a wireless communication protocol.

The computer input device 130 may include a user input portion 132 and a radio device 134. The user input portion 132 may include structures configured to enable the user 150 to interact with the first computer 110 and with the second computer 120. For example, the user input portion 132 may include one or more keys or buttons responsive to the user 150. As another example, the computer input device 130 may be a human interface device (HID) such as one or more of a mouse, a keyboard, a trackball, a stylus, and a game controller. The radio device 134 may be configured to communicate wirelessly with the first computer 110 and with the second computer 120 (e.g., via the first wireless connection 160 and via the second wireless connection 170, respectively). In at least one embodiment, the radio device 134, the first wireless connection 160, and the second wireless connection 170 each comply with an Institute of Electrical and Electronics Engineers (IEEE) 802.15.1 wireless protocol.

In operation, the user 150 may initiate the first wireless connection 160 between the first computer 110 and the computer input device 130, such as by accessing the user input portion 132 or by logging into the first computer 110 (e.g., via another computer input device). Logging into the first computer 110 may cause the first computer 110 to establish (e.g., via the first transceiver 114 and the radio device 134) the first wireless connection 160. For example, if the computer input device 130 operates according to an IEEE 802.15.1 protocol or a similar protocol, the user 150 may pair the computer input device 130 with one or more of the computers 110, 120 so that each of the computer input device 130 and the computers 110, 120 creates and stores authentication information to be used for subsequent wireless connections. A device manager of the computers 110, 120 may facilitate such pairing, or pairing may be facilitated using proximity sensors, such as near field communication (NFC) if available, as described further below.

In at least one embodiment, after establishing the first wireless connection 160, the first camera 117 may capture (e.g., periodically or occasionally capture) images of the region surrounding the user 150 (which may contain the user 150), such as a first image. The first image analyzer 112 may analyze the first image (e.g., by analyzing data related to the first image) to determine presence or absence of the user 150, and if the user 150 is present, to further determine a visual orientation of the user 150. In FIG. 1, a first visual orientation of the user 150 of FIG. 1 is generally designated 152, indicating that the user 150 is visually orientated toward (e.g., viewing) the first display device 116 at a first time.

In at least one embodiment, the first camera 117 accesses the first user profile 119 to determine the first visual orientation 152 of the user 150. For example, the first user profile 119 may include data specific to the user 150, such as facial recognition data to "authenticate" the user 150. For example, when multiple users are using or positioned near the workstation 100, the first computer 110 may utilize the first user profile 119 to ensure that the visual orientation of the intended user is being assessed (i.e., the user 150 in the particular example of FIG. 1). When the first visual orientation 152 indicates that the user 150 is oriented toward the first computer 110 (e.g., is visually oriented toward the first display device 116), the first computer 110 may maintain the first wireless connection 160. The first user profile 119 may be associated with an IEEE 802.15.1 wireless protocol or with a particular layer of a protocol stack associated with the IEEE 802.15.1 wireless protocol (e.g., a particular layer of a "Bluetooth" protocol stack). Including the first user profile 119 in a particular layer of a protocol stack, such as a "Bluetooth" protocol stack, may enable face recognition, such as to authenticate the user 150 so that only the user 150 may use the workstation 100. Further, when multiple users are positioned in front of the workstation 100, the multiple users may simultaneously gaze at both the display devices 116, 126, in which case both the computers 110, 120, might attempt to connect with the computer input device 130. Such a scenario may be avoided by utilizing the face recognition information corresponding to the user 150 (e.g., in the protocol stack) as a further input to image analyzers 112, 122 to trigger connection or disconnection of wireless connections.

While operating the workstation 100, the user 150 may change orientation. For example, the user 150 may leave the workstation 100 or may become reoriented toward the second computer 120, such as by changing from the first visual orientation 152 to a second visual orientation 154. After the user 150 has changed orientation, the first camera 117 may capture a second image and/or video sequence of the user 150 at a second time (e.g., while periodically or occasionally capturing images). The first image analyzer 112 may analyze the second image and/or video sequence (or data related to the second image and/or video sequence) to determine that the user 150 is not visually oriented toward the first display device 116 (e.g., by determining that the user 150 is no longer oriented according to the first visual orientation 152). Upon detecting that the user 150 is not visually oriented toward the first display device 116, the first transceiver 114 may terminate the first wireless connection 160.

In at least one embodiment, the first timer 118 is configured to cause the first transceiver 114 to wait a first predetermined time period (which may be indicated by the first user profile 119) after the determination is made that the user 150 is not visually oriented toward the first display device 116 prior to terminating the first wireless connection 160. For example, the first camera 117 may capture a third image at a third time in response to expiration of the first predetermined time period counted by the first timer 118. The first image analyzer 112 may analyze the third image (or data related to the third image) to determine whether the user 150 is visually oriented toward the first display device 116. If the first image analyzer 112 determines based on the third image that the user 150 is not visually oriented toward the first display device 116, then the first transceiver 114 may terminate the first wireless connection 160. If the first image analyzer 112 determines based on the third image that the user 150 is again visually oriented toward the first display device 116 (e.g., the user 150 briefly looked away from the first display device 116 but is again visually oriented toward the first display device 116), then the first transceiver 114 may maintain the first wireless connection 160.

The cameras 117, 127 may periodically or occasionally monitor the presence/absence and orientation of the user 150 and may use a threshold time duration (e.g., counted by the timers 118, 128) to decide whether or not the user 150 is looking at either of the displays (e.g., to reduce likelihood of "jittery" behavior in connecting and disconnecting the computer input device 130). For example, if the user 150 momentarily reorients towards the second display device 126 but does not intend to begin using the second display device 126 (or the second computer 120), it may be undesirable to immediately disconnect the first wireless connection 160. Accordingly, such threshold time duration may "filter" out any momentary reorientations of the user 150 (e.g., from the first visual orientation 152 to the second visual orientation 154) from causing connection/disconnection of the computer input device 130 and may provide soft decision making on whether or not the user 150 is looking at (e.g., visually oriented toward) one of the display devices 116, 126. Further, the threshold time duration may be preprogrammed at one or more of the computers 110, 120, dynamically adjusted, stored at the user profiles 119, 129, or a combination thereof.

The second computer 120 may capture images of the user 150 to determine orientation of the user 150. For example, the second camera 127 may periodically or occasionally capture images and/or video sequences and the second image analyzer 122 may analyze the images and/or video sequences (e.g., using the second user profile 129) to determine whether a user (e.g., the user 150) is visually oriented toward the second display device 126. In response to determining that the user 150 is visually oriented toward the second display device 126 (e.g., in response to determining that the user 150 has reoriented from the first visual orientation 152 to the second visual orientation 154), the second transceiver 124 may establish the second wireless connection 170. The second wireless connection 170 may be established in response to termination of the first wireless connection 160 (e.g., in response to the user 150 reorienting from the first visual orientation 152 to the second visual orientation 154).

In at least one embodiment, the second timer 128 is configured to cause the second transceiver 124 to wait a second predetermined time period (which may be indicated by the second user profile 129) after determining that the user 150 is visually oriented toward the second display device 126 prior to establishing the second wireless connection 170. For example, the second camera 127 may capture a fourth image and/or video sequence at a fourth time in response to expiration of the second predetermined time period counted by the second timer 128. The second image analyzer 122 may analyze the fourth image and/or video sequence (or data related to the fourth image) to determine whether the user 150 is visually oriented toward the second display device 126. If the second image analyzer 122 determines based on the fourth image that the user 150 is not visually oriented toward the second display device 126, then the second transceiver 124 may not establish the second wireless connection 170 (e.g., the user 150 briefly looked at the second display device 126 but has since looked away from the second display device 126). If the second image analyzer 122 determines based on the fourth image that the user 150 is still visually oriented toward the second display device 126, then the second transceiver 124 may establish the second wireless connection 170.

Thus, the workstation 100 of FIG. 1 may enable efficient (e.g., "automatic") connection and termination of wireless connections between computers and computer input devices. For example, because the wireless connections 160, 170 of FIG. 1 may be terminated and established based on user orientation (e.g., based on the visual orientations 152, 154 of the user 150), it may be unnecessary for the user 150 to "designate" which of the computers 110, 120 the user 150 intends to use. Further, terminating the wireless connections 160, 170 may conserve power at the computers 110, 120 and the computer input device 130, which may be particularly advantageous for battery-powered computer input devices.

The specific example of FIG. 1 (as well as FIGS. 2-8) is illustrative and various structures and features have been omitted from FIG. 1 for clarity of description. For example, any of the components of the first computer 110 may be communicatively coupled via a first bus or other structure. Similarly, components of the second computer 120 may be communicatively coupled via a second bus or other structure, and components of the computer input device 130 may be communicatively coupled via a third bus or other structure. Further, each of the first computer 110, the second computer 120, and the computer input device 130 may include other structures described herein. For example, one or both of the first computer 110 and the second computer 120 may include sleep mode logic, such as sleep mode logic 316, 326, respectively, described below with reference to FIG. 3. The computer input device 130 may include sleep mode logic 538 described below with reference to FIG. 5. Still further, although the particular embodiment of FIG. 1 depicts a single user (i.e., the user 150), the workstation 100 may be configured for multiple users. For example, one or both of the first computer 110 and the second computer 120 may include multiple user profiles each corresponding to a respective user. Still further, the workstation 100 may include three or more computers. In addition, while the particular example of FIG. 1 depicts one computer input device (i.e., the computer input device), according to further embodiments, the workstation 100 may include multiple computer input devices.

Figure 2:
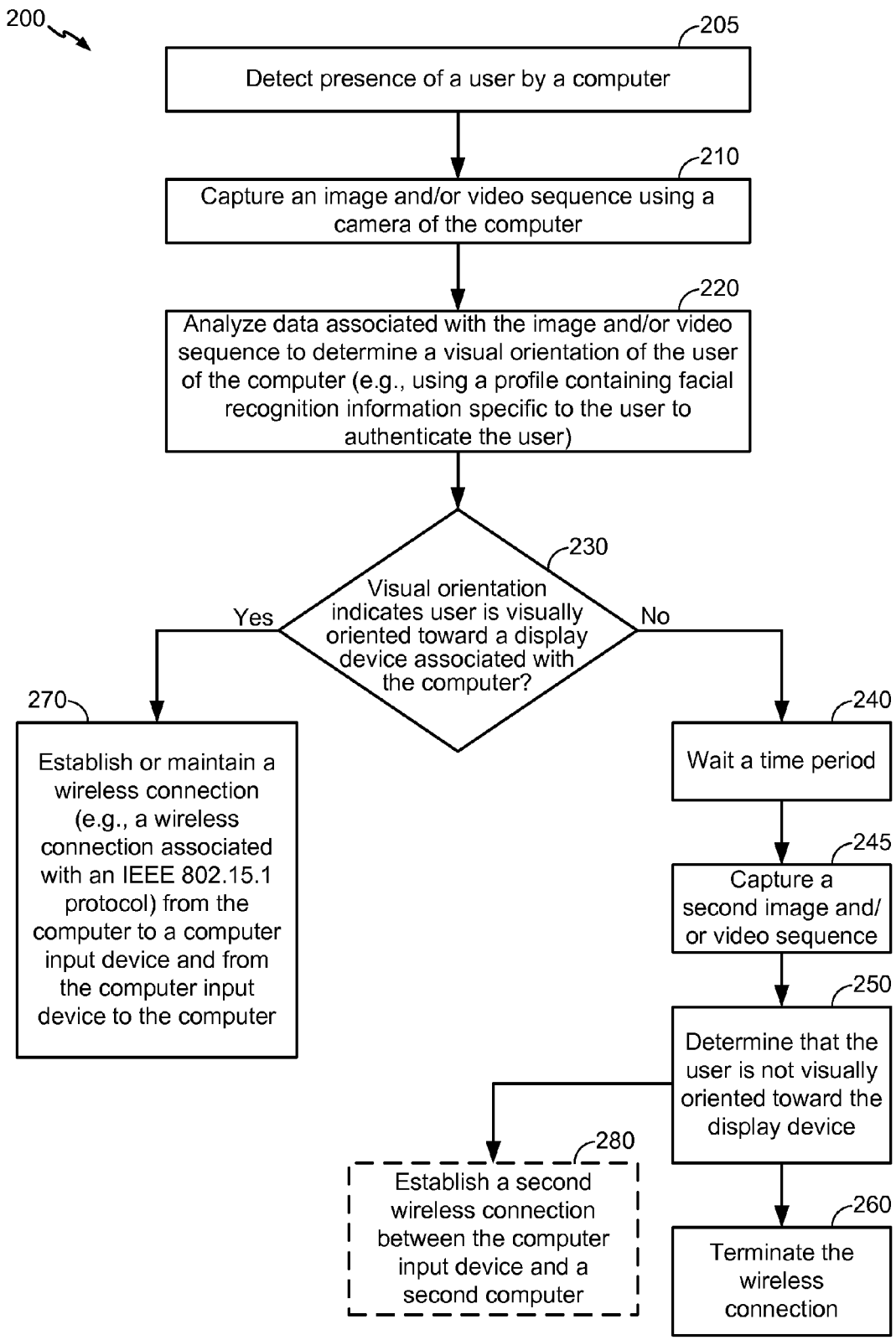
FIG. 2 is a flow diagram illustrating a particular example method of operation of the workstation of FIG. 1.

Referring to FIG. 2, a particular example of a method of operation of a computer (e.g., one or both of the first computer 110 and the second computer 120) is depicted and generally designated 200. The method 200 includes detecting presence of a user (e.g., the user 150) by the computer, at 205. For example, in at least one embodiment, presence of the user is detected based on the user logging into the computer. In at least another embodiment, a camera of the computer records a video stream and analyzes captured images (e.g., using one of the image analyzers 112, 122) to determine whether the user is present.

After presence of the user is detected, images may be captured to reevaluate (e.g., periodically or occasionally reevaluate) presence of the user. For example, images and/or video sequences may be captured to reevaluate (e.g., to periodically or occasionally reevaluate) presence and direction of gaze movement of the user. In the particular example of FIG. 2, the method 200 further includes capturing an image using a camera (e.g., the first camera 117 or the second camera 127) of the computer, at 210.

At 220, data associated with the image is analyzed to determine a visual orientation (e.g., the first visual orientation 152 or the second visual orientation 154) of the user of the computer. In at least one embodiment, the computer accesses a profile (e.g., the first user profile 119, the second user profile 129, or a combination thereof) associated with the user containing information, such as facial recognition information, specific to the user to authenticate the user (e.g., in order to avoid other users unintentionally affecting operation of the computer).

At 230, a determination is made (e.g., by the first image analyzer 112 or by the second image analyzer 122) whether the visual orientation indicates the user is visually oriented (e.g., at a first time) toward a display device (e.g., the first display device 116 or the second display device 126) associated with the computer. If the visual orientation indicates the user is visually oriented toward the computer (e.g., the visual orientation indicates the user is viewing a display device of the computer, such as the display device 116 or the display device 126), a wireless connection (e.g., the first wireless connection 160 or the second wireless connection 170) may be established or maintained (e.g., using the first transceiver 114 or using the second transceiver 124) from the computer to a computer input device (e.g., the computer input device 130) and from the computer input device to the computer, at 270.

If the visual orientation indicates the user is not visually oriented toward the computer (e.g., if the user has left the vicinity of the computer or is no longer viewing the display device), then a time period may be waited (e.g., counted by the first timer 118 or by the second timer 128), at 240. At 245, a second image of the user captured at a second time. At 250, a determination is made based on the second image that the user is not visually oriented toward the computer. The method 200 may further include terminating the first wireless connection, at 260. In at least one embodiment, a second computer (e.g., the second computer 120) forms a second wireless connection with computer input device, at 280. Alternatively, if the second image indicates that the user is again visually oriented toward the computer, then the first wireless connection may be maintained (not shown in FIG. 2).

Figure 3:
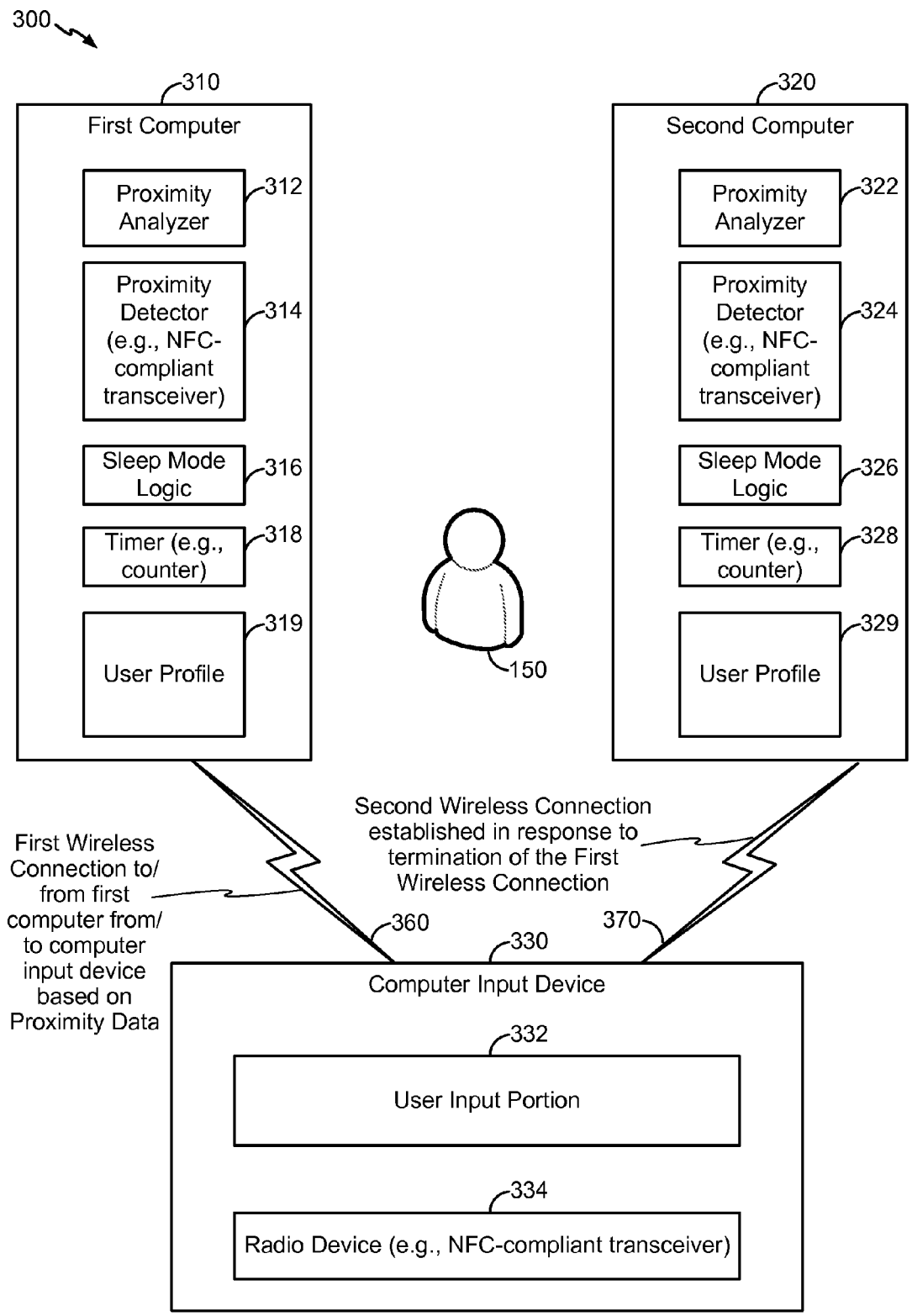
FIG. 3 is a diagram of another particular embodiment of the user and a workstation.

FIG. 3 depicts a particular illustrative embodiment of the user 150 and a workstation 300. The workstation 300 includes a first computer 310, a second computer 320, and computer input device (e.g., a human interface device (HID)) 330. In various embodiments, the functionalities and structures described with reference to the computers 310, 320 may be implemented in computer displays rather than entire computers, depending on the particular context.

In the particular example of FIG. 3, the first computer 310 includes a first proximity analyzer 312, a first proximity detector 314, first sleep mode logic 316, a first timer 318 (e.g., a counter), and a first user profile 319. One or more of the components of the first computer 310 may correspond to respective components of the first computer 110 of FIG. 1, the second computer 120 of FIG. 1, or a combination thereof.

The second computer 320 includes a second proximity analyzer 322, a second proximity detector 324, second sleep mode logic 326, a second timer 328 (e.g., a counter), and a second user profile 329. One or more of the components of the second computer 320 may correspond to respective components of the first computer 110 of FIG. 1, the second computer 120 of FIG. 1, or a combination thereof.

The computer input device 330 may include a user input portion 332 and a radio device 334. The computer input device 330, the user input portion 332, and the radio device 334 may correspond to the computer input device 130, the user input portion 132, and the radio device 134 of FIG. 1, respectively. The computer input device 330 may be responsive to input from the user 150. In at least one embodiment, the radio device 334 is configured to operate according to a "short range" communication protocol, such as a near field communication (NFC) protocol. For example, the radio device 334, the first proximity detector 314, and the second proximity detector 324 may be NFC-compliant transceivers configured to communicate according to an NFC protocol.

In operation, the first proximity detector 314 may communicate (e.g., using a first wireless connection 360, such as an NFC-based wireless connection) with the radio device 334 to determine first proximity data associated with the computer input device 330 relative to the first computer 310. For example, the first proximity data may indicate a strength of a signal that is detected by the first proximity detector 314 and that is sent by the radio device 334 of the computer input device 330. As used herein, "proximity data" may include a received signal strength indicator (RSSI), an RSSI based distance estimate, variations in electro-magnetic flux or other forms of energy, a signal indicating that two devices are within a predetermined range, other data indicating a physical position or physical movement, or a combination thereof.

The first proximity analyzer 312 may be responsive to the first proximity detector 314. For example, the first proximity analyzer 312 may analyze the first proximity data to determine whether the computer input device 330 is within a first predetermined range (e.g., a first area defined by a first radius of a particular length) of the first computer 310. In the particular example of FIG. 3, the first computer 310 is configured to establish or maintain the first wireless connection 360 upon determining that the computer input device 330 is within the first predetermined range and is further configured to terminate the first wireless connection 360 upon determining that the computer input device 330 is not within the first predetermined range. In at least one embodiment, data indicating the first predetermined range is included in a user profile 319. For example, the user profile 319 may include information specific to the user 150, such as a range of locations where the user 150 typically positions the computer input device 330 when using the computer input device 130 to operate the first computer 310. The proximity analyzer 312 may continuously, periodically, or occasionally monitor variations in determined proximity data, data such as an RSSI, in order to determine if the computer input device 330 is moving away from or is moving closer to the first computer 310.

In at least one embodiment, the first timer 318 is configured to cause the first proximity detector 314 to wait a first predetermined time period (which may be indicated by the first user profile 319) after the determination is made (e.g., by the proximity analyzer 312) that the computer input device 130 is outside the first predetermined range prior to terminating the first wireless connection 360. For example, the first proximity detector 314 may generate additional proximity data upon expiration of the first predetermined time period and the first proximity analyzer 312 may analyze the additional proximity data to determine if the computer input device 330 is still outside the first predetermined range. If the computer input device 330 is within the first predetermined range upon expiration of the first predetermined time period, then the first computer 310 may maintain the first wireless connection 360. If the computer input device 330 is still outside the first predetermined range upon expiration of the first predetermined time period, then the first computer 310 may terminate the first wireless connection 360. In another particular embodiment, the proximity data may be used for initiating connection with the computer input device 330 (e.g., for initiating the first wireless connection 360) and not for disconnection of the computer input device 330. For example, when connected, the computer input device 330 may stay connected as long as it has not been brought within a predetermined range of the second computer 120. When the user 150 brings the computer input device 330 within the predetermined range of the second computer 120, the proximity detector 324 of the second computer 320 may detect the computer input device 130 and may attempt to connect to the computer input device 330, at which time the computer input device 330 may terminate the first wireless connection 360 with the first computer 310.

In the particular example of FIG. 3, the first sleep mode logic 316 may cause components of the first computer 310 to enter a low-power mode state upon termination of the first wireless connection 360. For example, the first sleep mode logic 316 may be configured to cause components of the first computer 310 associated with communication with the computer input device 330 to enter the low-power state upon termination of the first wireless connection 360. The first sleep mode logic 316 may be further configured to transition the components into an "active" (e.g., regular-power) mode of operation when the first wireless connection 360 is established (e.g., established upon determining that the computer input device 330 is within the first predetermined range).

The second proximity detector 324 may communicate (e.g., using a second wireless connection 370, such as an NFC-based wireless connection) with the radio device 334 to determine second proximity data associated with the computer input device 330 relative to the second computer 320. For example, the second proximity data may indicate a strength of a signal detected by the second proximity detector 324 sent by the radio device 334 of the computer input device 330.

The second proximity analyzer 322 may be responsive to the second proximity detector 324. For example, the second proximity analyzer 322 may analyze the second proximity data to determine whether the computer input device 330 is within a second predetermined range of the second computer 320. The second predetermined range may be a second area defined by a second radius of a particular length, which may be the same as or different than the first predetermined range associated with the first proximity analyzer 312.

In the particular example of FIG. 3, the second computer 320 is configured to establish or maintain the second wireless connection 370 upon determining that the computer input device 330 is within the second predetermined range and is further configured to terminate the second wireless connection 370 upon determining that the computer input device 330 is not within the second predetermined range. In at least one embodiment, data indicating the second predetermined range is included in a second user profile 329. For example, the second user profile 329 may include information specific to the user 150, such as a range of locations where the user 150 typically positions the computer input device 330 when using the computer input device 130 to operate the second computer 320. The disconnection may be initiated by the computer input device 330 upon detecting a new connection request from the second computer 320 (e.g., a request to establish the second wireless connection 370).

In at least one embodiment, the second timer 328 is configured to cause the second proximity detector 324 to wait a second predetermined time period (which may be indicated by the second user profile 329) after the determination is made that the computer input device 330 is outside the second predetermined range prior to terminating the second wireless connection 370. For example, the second proximity detector 324 may generate additional proximity data upon expiration of the second predetermined time period and the second proximity analyzer 322 may analyze the additional proximity data to determine if the computer input device 330 is still outside the second predetermined range. If the computer input device 330 is now within the second predetermined range, then the second computer 320 may maintain the second wireless connection 370. If the computer input device 330 is still outside the second predetermined range, then the second computer 320 may terminate the second wireless connection 370.

In the particular example of FIG. 3, the second sleep mode logic 326 may cause components of the second computer 320 to enter a low-power mode state upon termination of the second wireless connection 370. For example, the second sleep mode logic 326 may be configured to cause components of the second computer 320 associated with communication with the computer input device 330 to enter the low-power state upon termination of the second wireless connection 370. The second sleep mode logic 326 may be further configured to transition the components into an "active" (e.g., regular-power) mode of operation when the second wireless connection 370 is established (e.g., established upon determining that the computer input device 330 is within the second predetermined range).

The workstation 300 described with reference to FIG. 3 may enable simplified and selective connection and termination of wireless connections between computers (e.g., the computers 310, 320) and computer input devices (e.g., the computer input device 330). For example, by analyzing proximity data associated with the computer input device 330, the computers 310, 320 can "automatically" establish and terminate the wireless connections 360, 370, respectively. Further, use of the timers 318, 328, may reduce instances of "undesired" termination of the wireless connections 360, 370, for example by waiting a predetermined time period prior to terminating the wireless connections 360, 370. Still further, the sleep mode logic 316, 326 may enable power savings by "powering down" components of the computers 310, 320 upon termination of the wireless connections 360, 370. Further, by utilizing the sleep mode logic 316, 326, components of the computers 310, 320 can be powered down in response to termination of the wireless connections 360, 370, saving power at the computers 310, 320.

Figure 4:
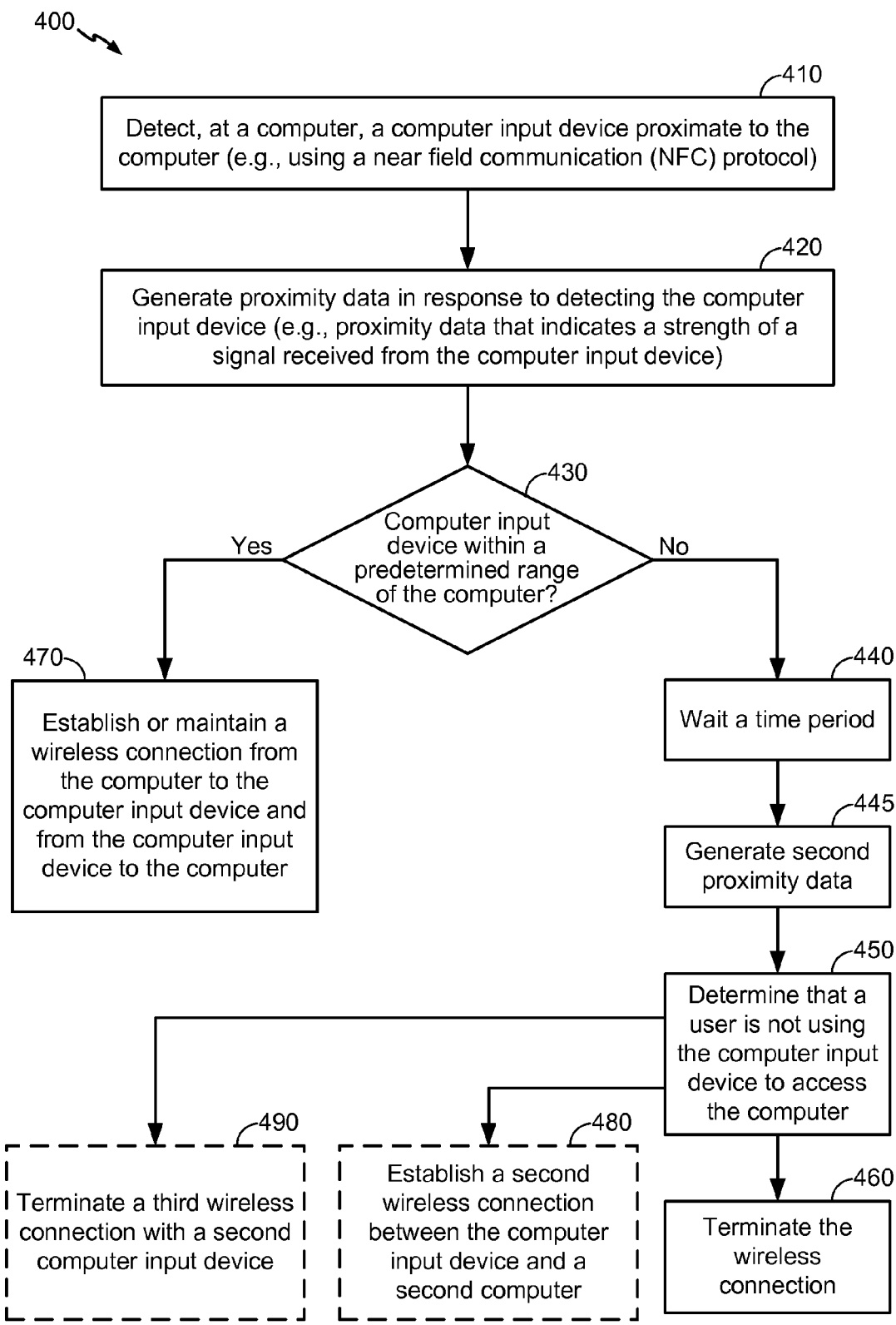
FIG. 4 is a flow diagram illustrating a particular example method of operation of the workstation of FIG. 3.

Referring to FIG. 4, a particular example of a method of operation of a computer (e.g., one or both of the first computer 310 and the second computer 320) is depicted and generally designated 400. The method 400 includes detecting, at the computer, a computer input device (e.g., the computer input device 330) proximate to the computer, at 410. For example, the first proximity detector 314 or the second proximity detector 324 may detect the computer input device 330 and generate proximity data in response to detecting the computer input device 330. In at least one embodiment, the computer detects the computer input device using a near field communication (NFC) protocol (e.g., using NFC-compliant radio devices).

The method 400 further includes generating proximity data in response to detecting the computer input device, at 420. For example, the first proximity detector 314 or the second proximity detector 324 may generate the proximity data. The proximity data may indicate a position of the computer input device relative to the computer. For example, the proximity data may indicate a strength of a signal, such as a signal in connection with the NFC protocol, received from the computer input device.

At 430, a determination is made whether the computer input device is within a predetermined range of the computer. The determination may be made by the first proximity analyzer 312 or by the second proximity analyzer 322 and may be based on whether the strength of the signal received from the computer input device exceeds a threshold. If the computer input device is within the predetermined range, then a wireless connection (e.g., the first wireless connection 360 or the second wireless connection 370) is established or maintained, at 470.

If the computer input device is not within the predetermined range, then a time period is waited (e.g., a time period counted by the first timer 318 or by the second timer 328), at 440. At 445, second proximity data associated with the computer input device may be determined (e.g., using the first proximity detector 314 or the second proximity detector 324). Based on the second proximity data, a determination is made, at 450, that a user (e.g., the user 150) is not using the computer input device to access the computer, at 450. For example, a second determination may be made at a second time that the computer input device is not within the predetermined range and that the user is therefore not using the computer input device to access the computer. In response to determining that the user is not using the computer input device to access the computer, the wireless connection may be terminated, at 460. The method 400 may further include establishing a second wireless connection between the computer input device and a second computer, at 480. Alternatively, if the second determination made at the second time indicates that the computer input device is within the predetermined range, then the wireless connection may be maintained (not shown in FIG. 4). The method 400 may also include causing (e.g., by the first sleep mode logic 316 or by the second sleep mode logic 326) components of the computer to enter a low-power state in response to terminating the wireless connection (not shown in FIG. 4).

In another particular embodiment, the proximity data may be used only for initiating wireless connections with the computer input device and not for disconnection. For example, to illustrate with reference to FIG. 3, when connected to the first computer 310 via the first wireless connection 360, the computer input device 330 may stay connected to the first computer 310 as long as it has not been brought within a predetermined range of the second computer 320. If the user 150 brings the computer input device 330 within the predetermined range of the second computer 320, the second proximity detector 324 of the second computer 320 may detect the computer input device 330 and may attempt to connect to the computer input device 330, at which time the computer input device 330 may terminate the first wireless connection 360 with the first computer 310. In a particular embodiment, by ensuring that the detection threshold of the proximity sensors is below the distance between the locations of the proximity detectors 314, 324, the user 150 may transition the computer input device 330 from one of the computers 310, 320 to the other of the computers 310, 320 by moving the computer input device 330 reasonably closer to the other of the computers 310, 320 (e.g., toward a display device).

A workstation may include multiple computer input devices. According to a particular embodiment, a workstation may terminate a second wireless connection with a second computer input device in response to terminating the wireless connection. That is, the second computer input device may be disconnected based on the proximity data associated with the computer input device. For example, a relatively "stationary" computer input device (e.g., a keyboard) may be disconnected in response to terminating the wireless connection with a "mobile" computer input device (e.g., a mouse), since in at least some workstations a user may intend to use each of the multiple computer input devices to control a particular computer. Accordingly, the method 400 of FIG. 4 may include terminating a third wireless connection with a second computer input device (e.g., a "large" or "stationary" computer input device, such as a full-size keyboard that is associated with the computer input device), at 490. According to further embodiments, the second computer input device is not disconnected in response to terminating the wireless connection with the computer input device.

Figure 5:
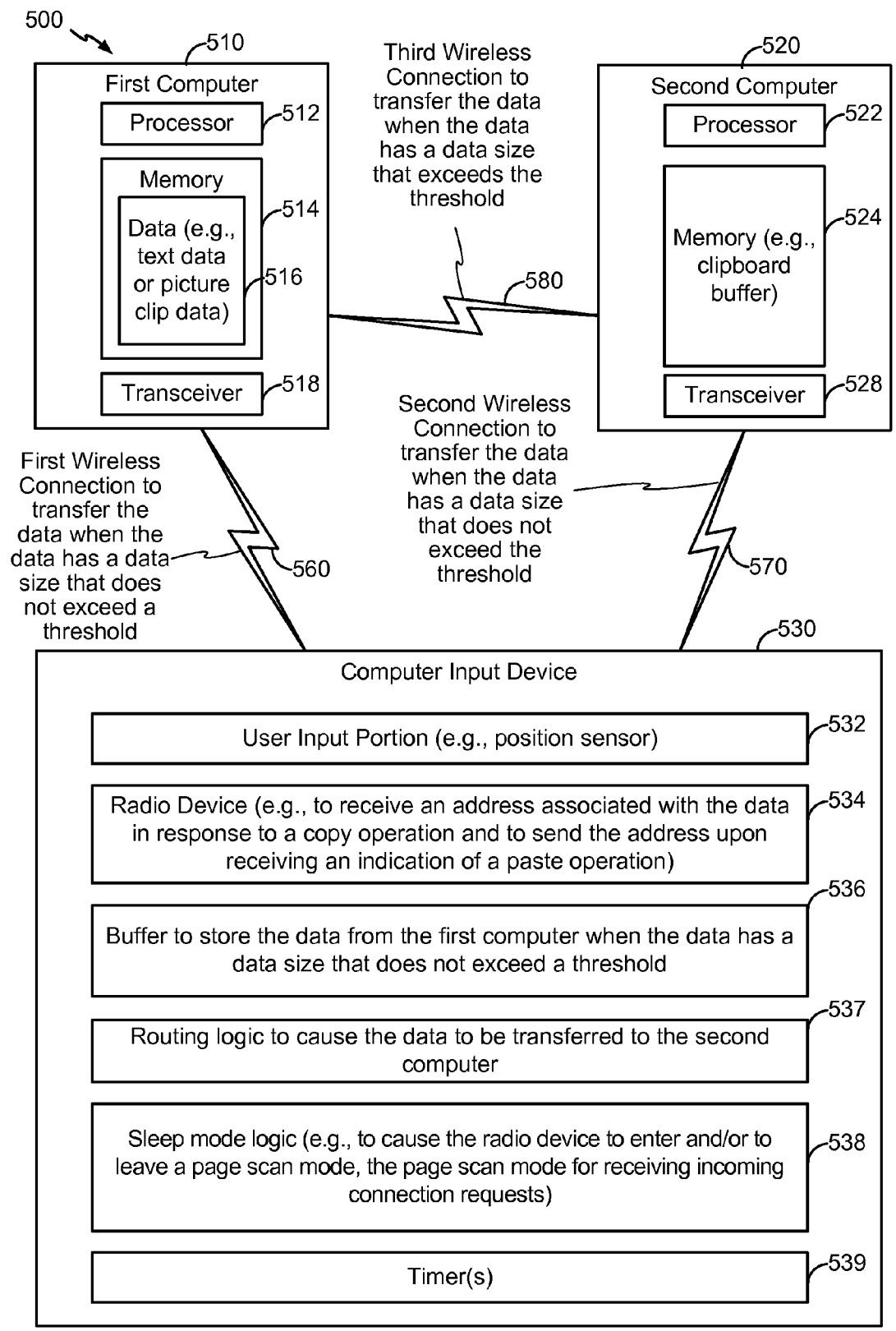
FIG. 5 is a diagram of another particular embodiment of a workstation.

Referring to FIG. 5, a particular illustrative embodiment of a workstation is depicted and generally designated 500. The workstation 500 includes a first computer 510, a second computer 520, and a computer input device 530.

In the particular embodiment of FIG. 5, the first computer 510 includes a first processor 512, a first memory 514, and a first transceiver 518. The second computer 520 includes a second processor 522, a second memory 524, and a second transceiver 528. The computer input device 530 includes a user input portion 532, a radio device 534, a buffer 536, routing logic 537, sleep mode logic 538, and a timer 539. One or both of the memories 514, 524 may include a "clipboard buffer" (e.g., for storing cut or copied data, such as text data and/or image data), as described further below with reference to operation of the workstation 500.

In the example of FIG. 5, the first computer 510 and the computer input device 530 are in communication via a first wireless connection 560 (e.g., a wireless connection that complies with an IEEE 802.15.1 wireless protocol), the second computer 520 and the computer input device 530 are in communication via a second wireless connection 570 (e.g., a wireless connection that complies with an IEEE 802.15.1 wireless protocol), and the first computer 510 and the second computer 520 are in communication via a third wireless connection 580 (e.g., a wireless local area connection (WLAN) and/or a wireless connection that complies with an IEEE 802.15.1 wireless protocol). As explained further, below, the third wireless connection 580 may be an ad-hoc wireless connection established to facilitate transfer of information from one of the computers 510, 520 to the other of the computers 510, 520.

In at least one embodiment and as explained further below, the computer input device 530 may function as an "intermediary" to determine whether such an ad-hoc connection between the computers 510, 520 is to be established and to initiate such an ad-hoc connection (e.g., based on a data size of data to be transferred, such as data 516). For example, the computer input device 530 may collect information (e.g., a device address, such as a Bluetooth device address) from the source computer (i.e., the computer at which the data was copied) and may provide this information to the destination computer (i.e., the computer where the data is to be pasted).

In operation, the computer input device 530 may be responsive to user input (e.g., via the user input portion 532) from a user, such as the user 150 of FIGS. 1 and 3 (not shown in FIG. 5). For example, the user input portion 532 may be responsive to user input associated with a request to send data (e.g., the data 516) from the first computer 510 to the second computer 520 (e.g., a "drag and drop" operation indicated by transferring a file, icon, or other graphic, or a "copy/cut and paste" operation from the first computer 510 to the second computer 520).

In response to the request, a determination may be made (e.g., by the routing logic 537) whether a data size of the data 516 exceeds a threshold (e.g., whether a number of bytes of the data 516 exceeds a predetermined byte threshold). In at least one embodiment, the threshold corresponds to a "capacity" (e.g., storage size) of the buffer 536. In response to the user input, the first computer 110 may communicate to the computer input device 530 (e.g., via the first wireless connection 560) the data size of the data 516. The routing logic 537 may compare the data size to the threshold to determine whether the data size of the data 516 exceeds the threshold. Alternatively or in addition, the computer input device 530 may communicate an indication of the threshold to the first computer 110, which may compare the data size of the data 516 to the threshold (e.g., using the processor 512).

If the data size of the data 516 does not exceed the threshold, the first computer 510 may send the data 516 (e.g., using the first transceiver 518) to the computer input device 530 (e.g., to the radio device 534). The data 516 may be sent via the first wireless connection 560. Upon receiving the data 516, the computer input device 530 may buffer the data 516 at the buffer 536. The computer input device 530 may be configured to send (e.g., using the radio device 534) the data 516 to the second computer (e.g., to the second transceiver 528).

If the data size of the data 516 exceeds the threshold, the data 516 may be transferred (e.g., transferred "directly") from first computer 510 to the second computer 520 (e.g., using the first transceiver 518 and the second transceiver 528, respectively). For example, in at least one embodiment, the third wireless connection 580 may be established to enable transfer of the data 516. The data 516 may accordingly be transferred via the third wireless connection 580. In a particular illustrative embodiment, the first computer 510 sends a message including a link (e.g., an address, a pointer that points to a location of the data 516, or a combination thereof) associated with the data 516 to the second computer 520. The second computer 520 may use the link to access the data 516 at the memory 514, such as by sending an access request to the first computer 510 to access the data 516. In a particular embodiment, an upper layer application, such as a desktop manager (described further with reference to FIGS. 9 and 10) or other such user mode program, is used by one or more of the computers 510, 520 to facilitate operations such as copying the data 516 from the first computer 510 and pasting the data 516 at the second computer 520. In a particular illustrative embodiment, such "copying and pasting" is accomplished without having a pre-established connection between the computers 510, 520 (e.g., is accomplished by establishing an ad-hoc network connection between the computers 510, 520, which may be the third wireless connection 580).

A particular example operation of the workstation 500 of FIG. 5 when the data size of the data 516 exceeds the threshold is provided for illustrative purposes. A user (e.g., the user 150 of FIGS. 1 and 3) may select and/or highlight text (and/or other data, such as an image) at the first computer 510 using the computer input device 530 and may copy the text at the first computer 510 (e.g., to a "clipboard buffer" included in the first computer 510). The text may correspond to the data 516. In response to the user copying the text (e.g., by performing a "copy operation" or a "cut operation" of the text), the first computer 510 may send to the computer input device 530 information, such an address of the data 516, a data size of the data 516, identification of the data 516, a path associated with the data 516, authentication information, or a combination thereof. The radio device 534 of the computer input device 530 may be configured to receive the information, such as the address of the data 516, and to send the address to the second computer 520, as explained further below.

The particular example operation may continue with the user moving the computer input device 530 toward the second computer 520 and attempting to paste the text at the second computer 520 (e.g., performing a "paste operation," such as by attempting to paste the text onto an editor running at the second computer 520). For example, if the computer input device is a mouse, the user may transfer a mouse pointer associated with the mouse from the first computer 510 to the second computer 520 and onto the editor. The second computer 520 may determine that the user intends to interact with the second computer 520, such as using one or more techniques described with reference to FIGS. 1-4 (e.g., based on a visual cue, proximity data, or a combination thereof). Upon detecting the paste operation from the user, the second computer 520 may determine that the second computer 520 does not have text stored at a clipboard buffer of the second computer 520 to be pasted (e.g., since the data 516 was copied at the first computer 510 and not the second computer 520).

Accordingly, the second computer 520 may send an indication of the paste operation to the computer input device 530. The indication of the paste operation may indicate that the user intends to transfer the data from the first computer 510 to the second computer 520. In a particular illustrative embodiment, in response to detecting the paste operation, the second computer 520 prompts the user through a graphical user interface (GUI) to confirm and/or query the user regarding the source of the data for the paste operation. For example, in the particular example depicted in FIG. 5, the source of the data 516 is the first computer 510 (e.g., a local clipboard buffer of the first computer 510). According to alternate embodiments, the source may be another clipboard buffer (e.g., a remote clipboard buffer of the first computer 510 or a clipboard buffer of a computer not shown in FIG. 5). According to a particular embodiment, if the user indicates (e.g., in response to the GUI prompt) that the source is a remote clipboard buffer, the second computer 520 may query the computer input device 530 regarding the source of the data for the paste operation (e.g., may query the computer input device 530 for a device address associated with the source of the data for the paste operation and/or for additional information related to the source of the data). Further, the indication of the paste operation sent from the second computer 520 to the computer input device 530 may indicate selection by the user of the source from which the text is to be pasted.

In response to receiving the indication from the second computer 520, the computer input device 530 may send to the second computer 520 the information (or a portion thereof) received from the first computer 510, such as a device address (e.g., a Bluetooth address) associated with the first computer 510 to enable the second computer 520 to request and to establish a direct wireless link with the first computer 510. For example, in a particular embodiment, the computer input device 530 provides a link (e.g., an address) corresponding to the data 516 to the second computer 520. The computer input device 530 may issue a request to the second computer 520 to establish a direct wireless link with the first computer using the information. The direct wireless link may be the third wireless connection 580.

In response to receiving the request from the computer input device 530, the second computer 510 may request a connection with the first computer 510 (e.g., may request the third wireless connection 580), may request the data 516 (e.g., using the link provided by the computer input device 530), or a combination thereof. The particular example operation may continue with the first computer 510 accepting the connection request (e.g., establishing the third wireless connection 580) and providing the data 516 to the second computer 520 via the third wireless connection 580 (e.g., to complete the "paste" operation). Optionally, the particular example operation may include the second computer 520 disconnecting the third wireless connection 580 in response to receiving the data 516 from the first computer 510 (e.g., to save power at the transceivers 518, 528).

Further, the sleep mode logic 538 of the computer input device 530 may conserve power at the computer input device 530. For example, in the particular embodiment of FIG. 5, the sleep mode logic 538 may cause the computer input device 530 (or one or more components thereof) to enter a low-power state, such as in response to the computers 510, 520 terminating wireless connections (e.g., the wireless connections 560, 570) with the computer input device 530 (e.g., in response to a visual orientation of a user, as described with reference to FIGS. 1 and 2, in response to proximity data, as described with reference to FIGS. 3 and 4, or a combination thereof). Further, the timer 539 may cause the sleep mode logic 538 to wait a predetermined time period before causing the low-power state in response to termination of the wireless connections (e.g., a predetermined time period during which the second computer may establish the second wireless connection 570 with the computer input device 530 after the first computer 510 terminates the first wireless connection 560). Although not shown in FIGS. 1 and 3, one or both of the computer input devices 130, 330 may include the sleep mode logic 538, the timer 539, or a combination thereof.

According to a particular example, when not actively in use, the computer input device 530 may remain in a low-power state (e.g., sleep or hibernate). To further save power, the computer input device 530 may power-down the radio device 534, thus terminating one or more wireless connections. In a particular embodiment, when the user 150 accesses the computer input device 530 indicating his/her intention to use the computer input device 530, one or more sensors (e.g., the user input portion 532, which may include a position sensor and/or a motion sensor, such as an accelerometer) may power on circuitry (e.g., the radio device 534) and cause the computer input device 530 to enter a page-scan mode where the computer input device 530 can receive wireless connection requests (e.g., from the computers 510, 520). The wireless connection requests may be sent by a computer in response to the computer determining that a user intends to use the computer (e.g., based on user visual orientation, user eye gaze movement, proximity data, or a combination thereof, as described variously with reference to FIGS. 1-5).

The user input portion 532 may include a position sensor. For example, in at least one embodiment, the computer input device 530 is a mouse device that includes a position sensor to track position or movement of the mouse (e.g., in response to user input). Further, the sleep mode logic 538 may be configured to cause components of the computer input device 530 (e.g., the radio device 534) to enter a sleep mode in response to not detecting user input (e.g., upon not detecting any motion of the computer input device 530 and/or upon not detecting a change in position of the computer input device 530) within a time period, which may be counted by the timer 539. The sleep mode may be terminated in response to the user input portion 532 detecting user input (e.g., the radio device 534 may terminate a low-power state and enter a regular mode of operation).

Thus, the workstation 500 of FIG. 5 enables efficient transfer of data (e.g., the data 516) between computers (e.g., the computers 510, 520). For example, the workstation 500 of FIG. 5 may enable a simplified user experience where user input (e.g., a "drag and drop" or a "copy and paste" operation from the first computer 510 to the second computer 520, or vice versa) results in an "automatic" transfer of data, thus potentially avoiding "manual" transfer of the data by a user (e.g., using an external memory device to move the data). Further, because data may be routed directly between the computers 510, 520 when a data size of the data exceeds a threshold, power may be conserved at the computer input device 530 and data transfer speed may be increased (e.g., by avoiding buffering a large amount of data at the buffer 536). Still further, because the sleep mode logic 538 may cause the computer input device 530 (or one or more components thereof) to enter a sleep mode when user input is not detected within a time period, power may be saved at the computer input device 530, which may extend battery life for the computer input device 530.

Figure 6:
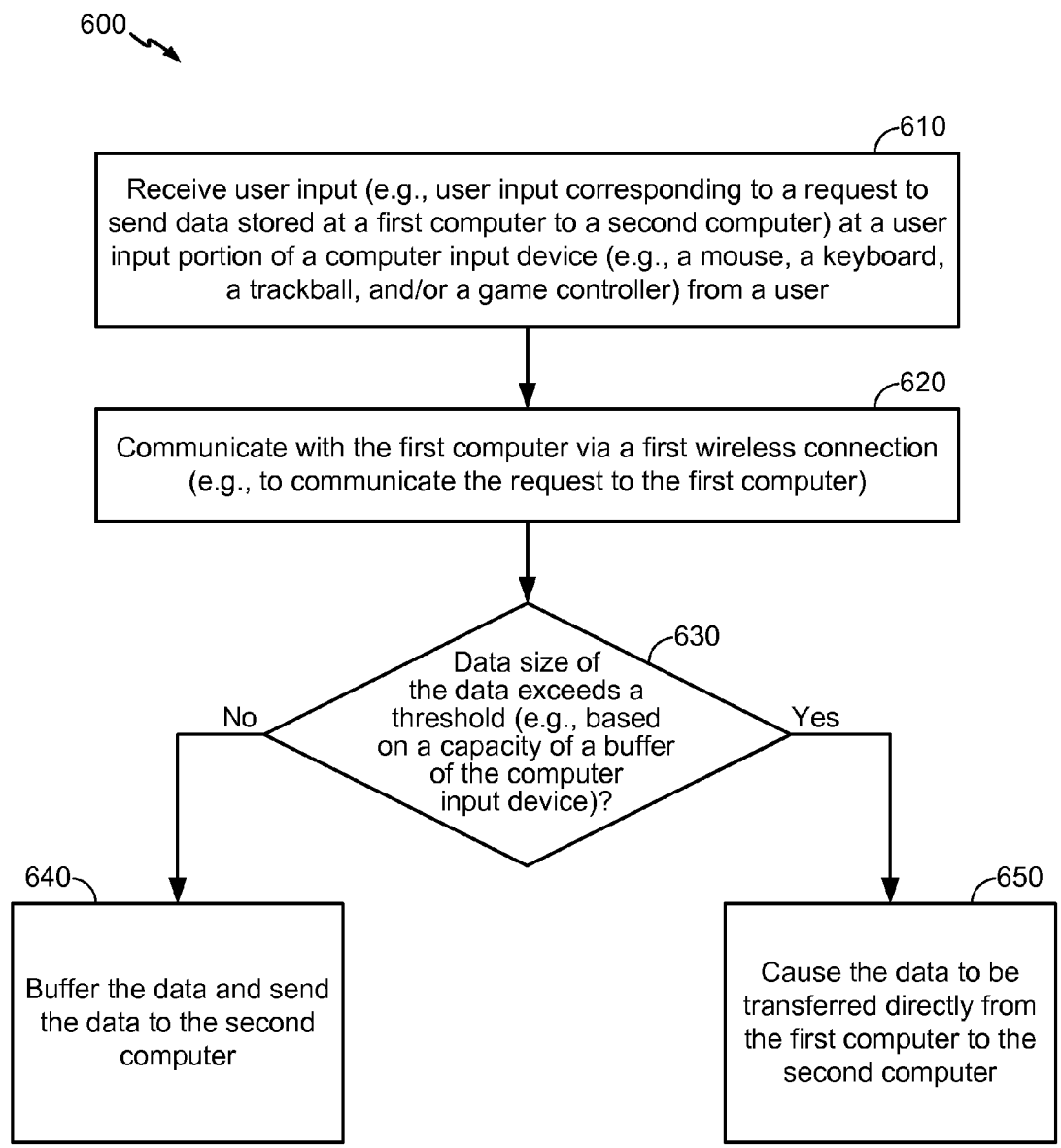
FIG. 6 is a flow diagram illustrating a particular example method of operation of the workstation of FIG. 5.

Referring to FIG. 6, a method of operation of a computer input device (e.g., one or more of the computer input devices 130, 330, 530) is depicted and generally designated 600. The method 600 includes receiving user input at a user input portion (e.g., at any of the user input portions 132, 332, 532) from a user (e.g., the user 150), at 610. The user input may correspond to a request to send data (e.g., the data 516) stored at a first computer (e.g., one of the computers 110, 120, 310, 320, 510, and 520) to a second computer (e.g., another of the computers 110, 120, 310, 320, 510, and 520). The computer input device may be a mouse, a keyboard, a trackball, a game controller, or a combination thereof.

The method 600 further includes communicating with the first computer via a first wireless connection (e.g., one of the wireless connections 160, 170, 360, 370, 560, and 570) to communicate the request to the first computer, at 620. For example, the first computer may receive a user input request from the computer input device and may determine that the user input request corresponds to a request to transfer data to the second computer. At 630, a determination is made (e.g., by the routing logic 537 in response to a request from the first computer, or by the first computer) whether a data size of the data exceeds a threshold. In at least one embodiment, the threshold is based on a capacity of a buffer (e.g., the buffer 536) of the computer input device.

If the data size of the data does not exceed the threshold, then the data may be buffered and sent to the second computer, at 640. If the data size exceeds the threshold, then the computer input device may cause the data to be transferred directly from the first computer to the second computer (e.g., via the third wireless connection 580), at 650. For example, if the data size exceeds the threshold, the data may be transferred from the first computer to the second computer according to the particular example operation described with reference to FIG. 5.

Figure 7:
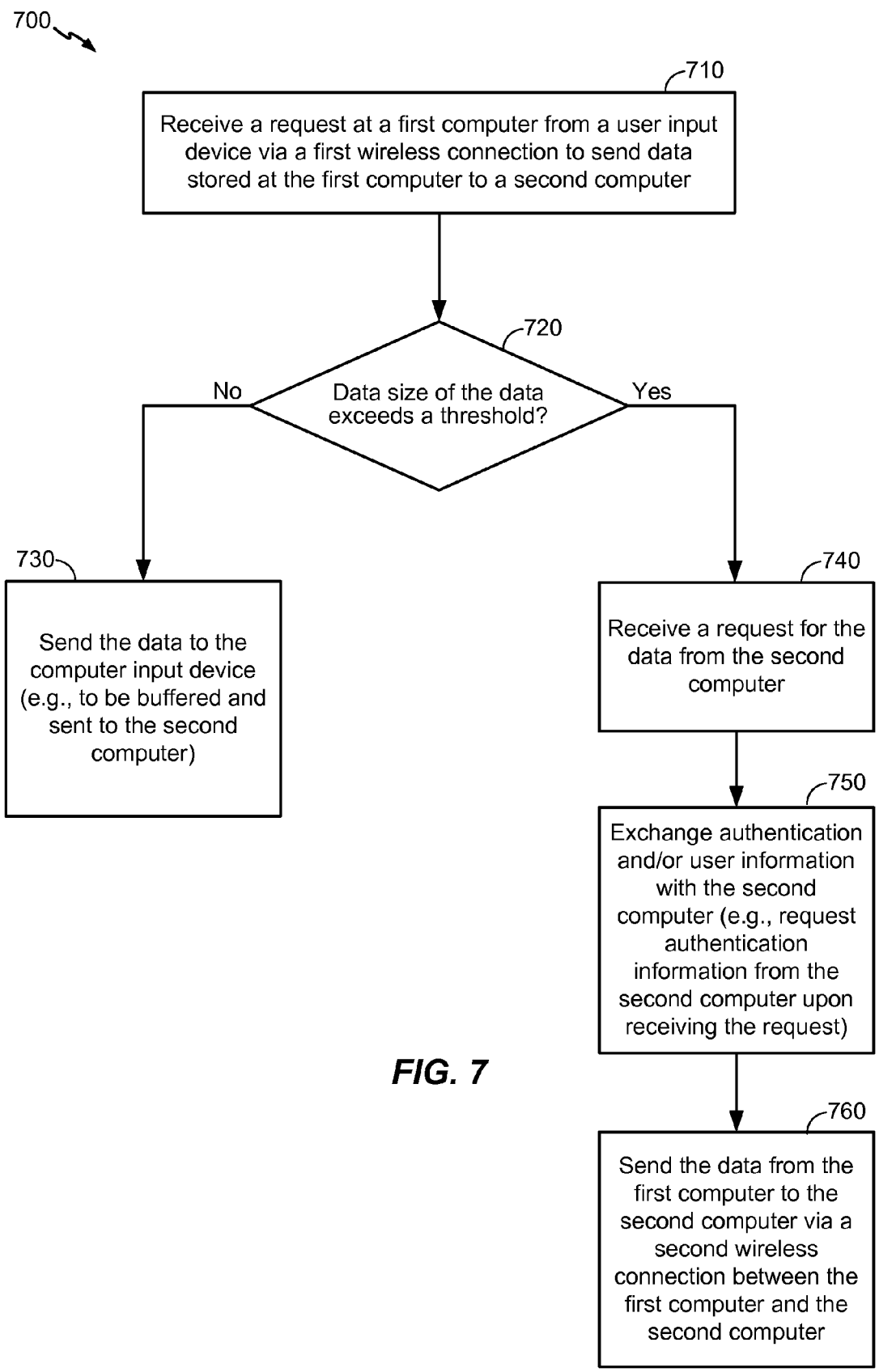
FIG. 7 is a flow diagram illustrating another particular example method of operation of the workstation of FIG. 5.

Referring to FIG. 7, a method of operation of a first computer (e.g., one of the computers 110, 120, 310, 320, 510, and 520) is depicted and generally designated 700. The method 700 includes receiving a request at the first computer from a computer input device (e.g., one or more of the computer input devices 130, 330, 530) via a first wireless connection (e.g., one of the wireless connections 160, 170, 360, 370, 560, 570) to send data (e.g., the data 516) stored at the first computer to a second computer (e.g., another of the computers 110, 120, 310, 320, 510, and 520), at 710. A determination is made, at 720, whether a data size of the data exceeds a threshold. For example, in at least one embodiment, the first computer compares the data size of the data to an indication of the threshold communicated from the computer input device to the first computer.

If the data size does not exceed the threshold, the data is sent to the computer input device, at 730. In at least one embodiment, the data is buffered at the computer input device (e.g., buffered at the buffer 536) and is sent to the second computer (e.g., via another of the wireless connections 160, 170, 360, 370, 560, and 570).

If the data size exceeds the threshold, then the method 700 may include receiving a request from the second computer for the data, at 740. The request may identify the data (e.g., by indicating the address), may request a second wireless connection to be established between the first computer and the second computer (e.g., the third wireless connection 580), or a combination thereof.

At 750, authentication and/or user information may be exchanged with the second computer. For example, upon receiving the request from the second computer, the first computer may request authentication information and/or user information from the second computer (e.g., in order to secure exchange of the data). In a particular embodiment, the second computer responds to the request for authentication information and/or user information with information provided by the computer input device (which may have been supplied to the computer input device by the first computer). Accordingly, in at least one embodiment, the second wireless connection is a secured communication channel (e.g., is secured using authentication information, user information, or a combination thereof, which may be supplied at least in part by the computer input device).

The method 700 further includes sending the data from the first computer to the second computer via a second wireless connection between the first computer and the second computer (e.g., via the third wireless connection 580), at 760. For example, if the data size exceeds a storage size or capacity associated with the computer input device, the data may be transferred from the first computer to the second computer according to the particular example operation described with reference to FIG. 5.

Referring to FIG. 8, a particular illustrative embodiment of a computer configured to establish, maintain, and/or terminate a wireless connection based on a visual orientation of a user, eye gaze movement of the user, a proximity of a computer input device, a variation of proximity of the computer input device, or a combination thereof and/or to route data to a computer input device or to a second computer based on a data size is depicted and generally designated 800. The computer 800 may be any of the computers 110, 120, 310, 320, 510, and 520. Further, components and operation of the computer 800 of FIG. 8 may correspond to any of the computer input devices 130, 330, 530.

The computer 800 of FIG. 8 includes a processor 810. The processor 810 may include one or more of an image analyzer 812, a proximity analyzer 814, and a data router 894. The image analyzer 812 may correspond to the first image analyzer 112, the second image analyzer 122, or a combination thereof. The proximity analyzer 814 may correspond to the first proximity analyzer 312, the second proximity analyzer 322, or a combination thereof. In at least one embodiment, the data router 894 is configured to route data (e.g., the data 516) to a computer input device (e.g., one or more of the computer input devices 130, 330, 530) to a second computer (e.g., another of the computers 110, 120, 310, 320, 510, and 520). The image analyzer 812, the proximity analyzer 814, and the data router 894 may include hardware, processor-executable instructions stored at a non-transitory computer-readable medium (e.g., at a memory 832), or a combination thereof.

The memory 832 may store instructions 854, data 856, and a user profile 829. The user profile 829 may correspond to the first user profile 119, the second user profile 129, the first user profile 319, the second user profile 329, or a combination thereof. The instructions 854 may be executable by the processor 810 to establish, maintain, and/or terminate a wireless connection (e.g., the wireless connections 160, 170, 360, 370, 560, 570, or a combination thereof) based on a visual orientation (e.g., the visual orientations 152, 154, or a combination thereof) of a user (e.g., the user 150) and/or based on a proximity of the computer input device. Alternatively or in addition, the instructions 854 may be executable by the processor 810 to route data (e.g., the data 516, the data 856, or a combination thereof) to the computer input device or to the second computer based on a data size of the data. The data 856 may include the data 516. The data 856 may include position data, such as data indicating a relative physical position of multiple computers (such as whether the display device 816 is a "left-hand-side" or "right-hand-side" display in a workstation), as described further with reference to FIGS. 9 and 10. The user profile 829 may include user-specific information to "authenticate" a user associated with the computer 800.

Alternatively or in addition, the memory 832 may store "user state" indications based on whether or not a user (e.g., the user 150) is determined to be present at the computer 800. The "user state" indications may include "absent," "present," "gaze moving from left to right," "gaze moving from right to left," or a combination thereof. The "user state" indications may be determined by the image analyzer 812, the proximity analyzer 814, or a combination thereof (e.g., based on one or more of the visual orientations 152, 154 of FIG. 1, based on proximity data, or a combination thereof).

The user states may be determined using visual cues (e.g., visual cues determined by the image analyzer 812, such as a visual orientation of the user 150), proximity cues (e.g., proximity cues determined by the proximity analyzer 814, such as a proximity of a computer input device), or a combination thereof. The stored user state indications may include an indication associated with a present user state (e.g., an indication of how long the user 150 has been in a current state).

FIG. 8 further illustrates that a camera 817 is coupled to a camera controller 890. The camera 817 may correspond to the first camera 117, the second camera 127, or a combination thereof. The camera controller 890 may be further coupled to the processor 810 and to a display controller 826. The display controller 826 may be coupled to a display device 816, which may correspond to the first display device 116, the second display device 126, or a combination thereof. FIG. 8 also shows that the display controller 826 may be coupled to the processor 810. A coder/decoder (CODEC) 834 (e.g., an audio and/or voice CODEC) may be coupled to the processor 810. A speaker 836 and a microphone 838 may be coupled to the CODEC 834. Further, the computer 800 may include a power supply 844.

FIG. 8 also indicates that a wireless controller 840 may be coupled to the processor 810, to a radio frequency (RF) interface 846, and to a wireless antenna 842 via the RF interface 846. In at least one embodiment, the RF interface 846 includes circuitry configured to send and receive communications with the computer input device according to an Institute of Electrical and Electronics Engineers (IEEE) 802.15.1 wireless protocol, such as a "Bluetooth" protocol. Alternatively or in addition, the RF interface 846 may include circuitry configured to send and receive communications with the computer input device according to a proximity-based short-range communication protocol, such as a near field communication (NFC) protocol. Alternatively or in addition, the RF interface 846 may include circuitry configured to communicate with another computer via a wireless local area network (WLAN).

In a particular embodiment, the processor 810, the display controller 826, the memory 832, the CODEC 834, the camera controller 890, and the wireless controller 840 are included in a system-in-package or system-on-chip device 822. Moreover, in a particular embodiment, as illustrated in FIG. 8, the camera 817, the display device 816, the speaker 836, the microphone 838, the wireless antenna 842, the RF interface 846, and the power supply 844 are external to the system-on-chip device 822. However, each of the camera 817, the display device 816, the speaker 836, the microphone 838, the wireless antenna 842, the RF interface 846, and the power supply 844 can be coupled to a component of the system-on-chip device 822, such as an interface or a controller.

In conjunction with the described embodiments, an apparatus is disclosed that includes means for analyzing (e.g., one or more of the image analyzers 112, 122, 812) data associated with an image, a video sequence, or a combination thereof, captured by a camera (e.g., one or more of the cameras 117, 127, 817) to determine a visual orientation (e.g., one or more of the visual orientations 152, 154) of a user (e.g., the user 150) of a computer (e.g., one or more of the computers 110, 120, 310, 320, 510, 520, 800). The apparatus further includes means (e.g., the transceivers 114, 124, 518, 528, the proximity detectors 314, 324, or a combination thereof) for establishing or maintaining a wireless connection upon detecting that the visual orientation indicates that the user is visually oriented toward a display device (e.g., any of the display devices 116, 126, 816) associated with the computer. The wireless connection may be any of the wireless connections 160, 170, 360, 370, 560, 570. The wireless connection is from the computer to a computer input device (e.g., any of the computer input devices 130, 330, 530) and from the computer input device to the computer. The wireless connection is terminated upon determining that the visual orientation indicates that the user is not visually oriented toward the display device.

Referring to FIG. 9, a functional block diagram illustrating example operations of a workstation (e.g., one or more of the workstations 100, 300, 500) is depicted and generally designated 900. The operations may enable automatic determination of a relative physical position of two computer displays using eye gaze movement associated with a user and mouse pointer movement associated with a computer input device. For example, the operations may be performed by one or more of the computers 110, 120, 310, 320, 510, 520, and 800 to determine whether another of the computers 110, 120, 310, 320, 510, 520, and 800 is located to the left-hand-side or to the right-hand-side (e.g., to determine a relative positioning). For example, for ease of description, the operations of FIG. 9 are described in terms the first computer 110 determining a position relative to the second computer 120 of FIG. 1.

The operations include waiting to detect an event, at 902. Detecting the event may include detecting that a pointer (e.g., a mouse pointer) associated with a computer input device 930 (e.g., a mouse, which may be any of the computer input devices 130, 330, 530) has reached a boundary, such as a top boundary, a left boundary, a right boundary, or a bottom boundary, of a display device, such as one of the display devices 116, 126, 816. The pointer reaching the boundary may indicate that a user (e.g., the user 150) intends to use to the computer input device 930 to control another computer or device.

At 904, a determination is made whether the event has been triggered. If no event has been triggered, then the operations continue, at 902. If the event has been triggered, then the operations include initiating a last gaze movement query to a gaze movement detector (GMD) 908 and a last pointer movement query to a desktop manager 910 to obtain last gaze information and pointer movement information, respectively, at 906. The GMD 908 may include any of the cameras 117, 127, 817 and may periodically or occasionally capture and store images and/or video sequences, such as a video clip 912. For example, the GMD 908 may be configured to use the video clip 912 to detect and record a periodic user gaze movement direction 914. Further, the desktop manager 910 may be configured to detect and/or record pointer movement associated with the computer input device 930. The GMD 908 may include any of the image analyzers 112, 122, 812.

In response to the last gaze movement query and as shown in FIG. 9, the GMD 908 may issue (e.g., to one of the image analyzers 112, 122, 812 and/or to one of the processors 512, 522, 810) a first response that indicates whether a last gaze movement indicated a left-to-right gaze movement of the user or a right-to-left gaze movement of the user. Further, in response to the last pointer movement query and as shown in FIG. 9, the desktop manager 910 may issue (e.g., to one of the image analyzers 112, 122, 812 and/or to one of the processors 512, 522, 810) a second response that indicates a last pointer movement, such as left-to-right or right-to-left.

At 916, a determination is made (e.g., by one of the image analyzers 112, 122, 812 and/or to one of the processors 512, 522, 810) whether the first response and the second response match (i.e., whether the last gaze movement and the last pointer movement are both left-to-right or are both right-to-left). If the first response and the second response do not match, then a determination is made that no change in user intention to switch control is likely intended, at 918.

If the first response and the second response match, then the operations include informing the computer input device 930 of the event and issuing a query to the computer input device 930 whether the computer input device 930 received a new connection request, at 920. The query to the computer input device 930 may be communicated via an "over the air medium" 922, which may include any of the wireless connections 160, 170, 360, 370, 560, 570, 580. At 924, a determination is made based on a response from the computer input device 930 whether the computer input device 930 received a new connection request. If the response from the computer input device 930 indicates that no new connection request was received, then a wireless connection with the computer input device is maintained, at 926.

If the computer input device 930 received a new connection request (e.g., from another computer and within a prior predetermined time interval), then the operations include making a relative position designation. For example, a relative position designation may be made that a display of the first computer 110 is a left-hand-side display relative to the second computer 120 if the matched direction indicated left-to-right, or that the display of the first computer 110 is a right-hand-side display relative to the second computer 120 if the matched direction indicated right-to-left, at 928. The operations may further include disconnecting the computer input device, at 932. The operations may further include storing data (e.g., the data 856 of FIG. 8) indicating the relative positioning. The data may be subsequently accessed in response to a user accessing the computer input device 930 to determine if the user intends to transition user input control to or from the first computer 110.

Accordingly, the example of FIG. 9 may enable automatically determining a relative physical position of two computer displays using eye gaze movement associated with a user and mouse pointer movement associated with a computer input device. Determining the relative physical position may enable simplified workstations where computer input device control is transferred automatically and without "designation."

Referring to FIG. 10, a functional block diagram illustrating example operations of a workstation (e.g., one or more of the workstations 100, 300, 500) is depicted and generally designated 1000. The operations may enable automatic determination of a relative physical position of two computer displays based on "moving away" or "moving closer" information from proximity sensors and further based on with movement of a mouse pointer. For example, the operations may be performed by one or more of the computers 110, 120, 310, 320, 510, 520, and 800 to determine whether another of the computers 110, 120, 310, 320, 510, 520, and 800 is located to the left-hand-side or to the right-hand-side. For example, for ease of description, the operations of FIG. 10 are described in terms the first computer 310 determining a position relative to the second computer 310 of FIG. 3.

The operations include waiting to detect an event, at 1002. Detecting the event may include detecting that a pointer (e.g., a mouse pointer) associated with a computer input device 1030 (e.g., a mouse, which may be any of the computer input devices 130, 330, 530) has reached a boundary, such as a top boundary, a left boundary, a right boundary, or a bottom boundary, of a display device, such as one of the display devices 116, 126, 816. The pointer reaching the boundary may indicate that a user (e.g., the user 150) intends to use to the computer input device 1030 to control another computer or device.

At 1004, a determination is made whether the event has been triggered. If no event has been triggered, then the operations continue, at 1002. If the event has been triggered, then the operations include initiating a proximity query to a proximity analyzer 1008 and a last pointer movement query to a desktop manager 1010 to obtain a proximity response and pointer movement information, respectively, at 1006. The proximity analyzer 1008 may include any of the proximity analyzers 312, 322, 814, any of the proximity detectors 314, 324, or a combination thereof. The proximity analyzer 1008 may periodically or occasionally detect and/or measure radio signal strength data 1012 (e.g., based on signals sent by the computer input device 1030). The proximity analyzer 1008 may be configured to use the radio signal strength data 1012 to determine whether the computer input device 1030 is within a predetermined range of the first computer 310, for example using periodic proximity-based movement direction detection 1014, to generate the proximity response. The proximity response may include "moving away" or "moving closer" information (e.g., information that indicates whether a last movement of the computer input device 1030 was closer to or away from the first computer 310).

The desktop manager 1010 may be configured to detect and/or record pointer movement associated with the computer input device 1030 in order to generate the pointer movement information. The point movement information may indicate a last pointer movement, such as left-to-right or right-to-left.

At 1016, a determination is made whether the mouse pointer has moved away (e.g., away from a display of the first computer 310 and toward a display of the second computer 320, such as toward a boundary of the display of the first computer 310). For example, a determination may be made whether the mouse pointer has moved toward the display of the second computer 320 within a prior predetermined time interval. Further, the proximity response may be analyzed to determine if the mouse has "moved away" from the display of the first computer 310. If the mouse pointer has not moved away (and/or if the mouse has not moved away), then a determination is made that no change in user intention to switch control is likely intended, at 1018.

If the mouse pointer has moved away, then the operations include informing the computer input device 1030 of the event and issuing a query to the computer input device 1030 whether the computer input device 1030 received a new connection request, at 1020. The query to the computer input device 1030 may be communicated via an "over the air medium" 1022, which may include any of the wireless connections 160, 170, 360, 370, 560, 570, 580. At 1024, a determination is made based on a response from the computer input device 1030 whether the computer input device 1030 received a new connection request. If the response from the computer input device 1030 indicates that no new connection request was received, then a wireless connection with the computer input device is maintained, at 1026.

If the computer input device 1030 received a new connection request, then the operations include making a relative positioning designation. For example, a designation may be made that a display of the first computer 310 is a left-hand-side display relative to the second computer 320 if the pointer direction motion indicated left-to-right, or making a designation that the display of the first computer 110 is a right-hand-side display relative to the second computer 120 if the pointer direction motion indicated right-to-left, at 1028. The operations may further include disconnecting the computer input device, at 1032. The operations may further include storing data (e.g., the data 856 of FIG. 8) indicating the relative positioning. The data may be subsequently accessed in response to a user accessing the computer input device 1030 to determine if the user intends to transition user input control to or from the first computer 310.

Accordingly, the particular example of FIG. 10 may enable automatically determining a relative physical position of two computer displays based on "moving away" or "moving closer" information from proximity sensors and further based on with movement of a mouse pointer. Determining the relative physical position may enable simplified workstations where computer input device control is transferred automatically and without "designation."

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
accessing a profile corresponding to a user of a computer, wherein the profile comprises facial recognition information specific to the user;
analyzing data associated with an image captured by a camera and the facial recognition information specific to the user to determine a visual orientation of the user of the computer;
upon detecting, based on the image captured by the camera and the facial recognition information specific to the user, that the visual orientation indicates that the user is visually oriented toward a display device associated with the computer, establishing or maintaining a wireless connection from the computer to a computer input device and from the computer input device to the computer; and
upon detecting, based on the image captured by the camera and the facial recognition information specific to the user, that the visual orientation indicates that the user is not visually oriented toward the display device associated with the computer, waiting a time period indicated by the profile, and after waiting the time period indicated by the profile if the visual orientation does not indicate that the user is again visually oriented towards the display device, terminating the wireless connection.

2. The method of claim 1, wherein the time period is counted by a counter included in the computer.

3. The method of claim 1, wherein the wireless connection is a direct wireless connection between the computer and the computer input device.

4. The method of claim 1, further comprising determining the visual orientation of the user based on the profile corresponding to the user, wherein the profile contains facial recognition information specific to the user and is usable by the computer to authenticate the user.

5. The method of claim 1, wherein the profile is associated with an Institute of Electrical and Electronics Engineers (IEEE) 802.15.1 wireless protocol.

6. The method of claim 5, wherein the profile is associated with a particular layer of a protocol stack associated with the IEEE 802.15.1 wireless protocol, and wherein the wireless connection complies with the IEEE 802.15.1 wireless protocol.

7. The method of claim 1, further comprising upon detecting that the visual orientation indicates that the user is not visually oriented toward the display device associated with the computer:
in response to expiration of the time period, analyzing data associated with a second image captured by the camera to determine the visual orientation of the user of the computer; and
upon detecting based on the second image captured by the camera that the visual orientation indicates that the user is not visually oriented toward the display device associated with the computer, terminating the wireless connection with the computer input device.

8. An apparatus comprising:
a proximity detector configured to detect a computer input device and to generate proximity data in response to detecting the computer input device, wherein the proximity detector is further configured to communicate wirelessly with the computer input device via a near field communication (NFC) protocol;
a proximity analyzer configured to analyze the proximity data to determine whether the computer input device is within a predetermined range of the proximity detector, wherein determining whether the computer input device is within the predetermined range comprises determining whether a signal strength of the proximity data exceeds a threshold;
a wireless transceiver coupled to the proximity analyzer and configured to establish or maintain a wireless connection with the computer input device upon the proximity analyzer determining that the computer input device is within the predetermined range and further configured to terminate the wireless connection upon the proximity analyzer determining that the computer input device is not within the predetermined range; and
a sleep mode logic configured to place the apparatus in a sleep mode in response to the wireless transceiver terminating the wireless connection with the computer input device.

9. The apparatus of claim 8, further comprising:
a camera configured to capture an image; and
an image analyzer configured to analyze data of the image to determine a visual orientation of a user,
wherein the wireless transceiver is further configured to establish or maintain the wireless connection upon detecting that the visual orientation indicates that the user is visually oriented toward a display device associated with the apparatus, and wherein the wireless transceiver is further configured to terminate the wireless connection upon detecting that the visual orientation and a last gaze movement associated with the user indicate that the user is not visually oriented toward the display device.

10. The apparatus of claim 8, wherein the transceiver is further configured to wait a time period prior to terminating the wireless connection with the computer input device after detecting that the computer input device is not within the predetermined range.

11. The apparatus of claim 8, wherein the computer input device is associated with a second computer input device, and wherein the wireless transceiver is further configured to establish or maintain a second wireless connection with the second computer input device upon the proximity analyzer determining that the computer input device is within the predetermined range, and wherein the wireless transceiver is further configured to terminate the second wireless connection with the second computer input device upon the proximity analyzer determining that the computer input device is not within the predetermined range.

12. A computer input device comprising:
a user input portion configured to receive input from a user, wherein the user input portion includes a position sensor;
a radio device coupled to the user input portion, wherein the radio device is configured to communicate with a first computer via a first wireless connection and is further configured to communicate with a second computer via a second wireless connection;
a buffer of the computer input device, wherein the buffer is configured to buffer data received from the first computer before the data is transferred to the second computer;
routing logic coupled to the radio device and to the buffer, wherein the routing logic is configured to cause the data stored in the buffer to be transferred to the second computer; and
sleep mode logic configured to cause the radio device to enter a sleep mode upon the position sensor not sensing a change in position of the computer input device within a time period.

13. The computer input device of claim 12, wherein the buffer is further configured to buffer the data when the data has a data size that does not exceed a threshold, and wherein the routing logic is further configured to cause the radio device to send the buffered data to the second computer via the second wireless connection.

14. The computer input device of claim 13, wherein the radio device is further configured to request the first computer to transfer the data directly to the second computer when the data size exceeds the threshold.

15. The computer input device of claim 12, wherein the computer input device is a mouse, a keyboard, a trackball, and a game controller, or a combination thereof.

16. The computer input device of claim 12, wherein the sleep mode logic is further configured to cause the radio device to enter the sleep mode in response to termination of the first wireless connection, the termination in response to a change in visual orientation of the user, a change in proximity of the computer input device relative to the first computer, or a combination thereof.

17. The computer input device of claim 16, further comprising a timer configured to count a second time period and to cause the sleep mode logic to cause the radio device to enter the sleep mode in response to not detecting the input from the user within the second time period.

18. A method comprising:
receiving a request at a first computer from a computer input device via a first wireless connection to send data stored at the first computer to a second computer, wherein the request identifies whether the data has a data size that exceeds a threshold, wherein the threshold is based on a capacity of a buffer of the computer input device;
when the data size exceeds the threshold, sending the data directly to the second computer via a second wireless connection between the first computer and the second computer and without sending the data to the computer input device; and
when the data size does not exceed the threshold, sending the data to the computer input device.

19. The method of claim 18, further comprising:
when the data size exceeds the threshold, sending a message to the second computer, wherein the message indicates a location of the data; and
receiving an access request from the second computer to access the location.

20. The method of claim 18, wherein one or more of the first wireless connection and the second wireless connection comply with an Institute of Electrical and Electronics Engineers (IEEE) 802.15.1 wireless protocol.

21. The method of claim 18, wherein the second wireless connection is a secured communication channel.

22. A computer-readable non-transitory storage medium storing instructions executable by a processor of a computer to cause the processor to:
access a profile corresponding to a user of the computer, wherein the profile comprises facial recognition information specific to the user;
analyze data associated with an image captured by a camera and the facial recognition information specific to the user to determine a visual orientation of the user of the computer;
upon detecting, based on the image captured by the camera and the facial recognition information specific to the user, that the visual orientation indicates that the user is visually oriented toward a display device associated with the computer, establish or maintain a wireless connection from the computer to a computer input device and from the computer input device to the computer; and
upon detecting, based on the image captured by the camera and the facial recognition information specific to the user, that the visual orientation indicates that the user is not visually oriented toward the display device associated with the computer, wait a time period indicated by the profile, and after waiting the time period indicated by the profile if the visual orientation does not indicate that the user is again visually oriented towards the display device, terminate the wireless connection.

23. The computer-readable non-transitory storage medium of claim 22, wherein the computer uses the profile corresponding to the user of the computer to determine the visual orientation of the user, the profile containing facial recognition information specific to the user and is usable by the computer to authenticate the user.

24. The computer-readable non-transitory storage medium of claim 22, wherein the profile is associated with an Institute of Electrical and Electronics Engineers (IEEE) 802.15.1 wireless protocol.

25. The computer-readable non-transitory storage medium of claim 24, wherein the profile is associated with a particular layer of a protocol stack associated with the IEEE 802.15.1 wireless protocol.

26. The computer-readable non-transitory storage medium of claim 22, wherein the wireless connection complies with an Institute of Electrical and Electronics Engineers (IEEE) 802.15.1 wireless protocol.

27. An apparatus comprising:
means for accessing a profile corresponding to a user of a computer, wherein the profile comprises facial recognition information specific to the user;
means for analyzing data associated with an image captured by a camera and the facial recognition information specific to the user to determine a visual orientation of the user of the computer; and
means for:
establishing or maintaining, upon detecting, based on the image captured by the camera and the facial recognition information specific to the user, that the visual orientation indicates that the user is visually oriented toward a display device associated with the computer, a wireless connection from the computer to a computer input device and from the computer input device to the computer; and
terminating the wireless connection upon detecting, based on the image captured by the camera and the facial recognition information specific to the user, that the visual orientation indicates that the user is not visually oriented toward the display device, and after waiting a time period indicated by the profile and not detecting that the visual orientation indicates that the user is again visually oriented towards the display device.

28. The apparatus of claim 27, wherein the wireless connection is a direct wireless connection between the computer and the computer input device.

29. The apparatus of claim 27, wherein the facial recognition information is usable by the computer to authenticate the user.

30. The apparatus of claim 27, wherein the profile is associated with an Institute of Electrical and Electronics Engineers (IEEE) 802.15.1 wireless protocol.

31. The apparatus of claim 30, wherein the profile is associated with a particular layer of a protocol stack associated with the IEEE 802.15.1 wireless protocol.

32. The apparatus of claim 27, wherein the wireless connection complies with an Institute of Electrical and Electronics Engineers (IEEE) 802.15.1 wireless protocol.

33. A method comprising:
monitoring eye gaze movement of a user by a camera;
monitoring mouse pointer movement associated with a computer input device;
automatically determining a relative physical position of a first display with respect to a second display using both of the monitored eye gaze movement and the monitored mouse pointer movement; and
storing data indicating the relative physical position.

34. The method of claim 33, further comprising upon detecting a physical movement of the computer input device, waking up the computer input device and putting the computer input device into page-scan mode to receive incoming connection requests.

35. A method comprising:
receiving information from one or more proximity sensors;
monitoring mouse pointer movement associated with a computer input device;
automatically determining a relative physical position of a first display with respect to a second display based on both of a direction of movement indicated by the received information from the one or more proximity sensors and the monitored mouse pointer movement; and
storing data indicating the relative physical position.

36. An apparatus comprising:
a user input portion configured to receive input from a user to copy data from a first computer to a buffer based on a copy operation; and
a radio device configured to:
cause a second computer to send a request for the data to the first computer in response to the user input portion receiving input indicating a paste operation;
receive from the first computer an address associated with the data; and
send to the second computer the address associated with the data upon receiving the input indicating the paste operation from the second computer to enable the second computer to establish a direct wireless connection with the first computer to send the request for the data to the first computer using the address.

37. The apparatus of claim 36, wherein upon receiving the request for the data from the second computer, the first computer requests authentication information or user information from the second computer.

* * * * *